United States Patent
Pang et al.

(10) Patent No.: US 11,668,600 B2
(45) Date of Patent: Jun. 6, 2023

(54) DEVICE AND METHOD FOR ADAPTATION OF VIRTUAL 3D AUDIO TO A REAL ROOM

(71) Applicant: Huawei Technologies Co., Ltd., Shenzhen (CN)

(72) Inventors: Liyun Pang, Munich (DE); Fons Adriaensen, Munich (DE); Song Li, Hannover (DE); Roman Schlieper, Hannover (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 86 days.

(21) Appl. No.: 17/205,916

(22) Filed: Mar. 18, 2021

(65) Prior Publication Data
US 2021/0231488 A1 Jul. 29, 2021

Related U.S. Application Data

(63) Continuation of application No. PCT/EP2018/075194, filed on Sep. 18, 2018.

(51) Int. Cl.
*G01H 7/00* (2006.01)

(52) U.S. Cl.
CPC ............ *G01H 7/00* (2013.01); *H04S 2420/01* (2013.01)

(58) Field of Classification Search
CPC ..... G10L 19/008; H04S 2420/01; H04S 7/30; G10K 15/10; G10K 15/08
USPC .......................................... 381/310, 306, 22
See application file for complete search history.

(56) References Cited

U.S. PATENT DOCUMENTS

| | | | |
|---|---|---|---|
| 11,250,834 B2* | 2/2022 | Audfray | G10K 15/12 |
| 2016/0134988 A1 | 5/2016 | Gorzel et al. | |
| 2017/0078819 A1* | 3/2017 | Habets | H04R 25/407 |
| 2017/0223478 A1* | 8/2017 | Jot | H04S 7/306 |
| 2017/0243597 A1* | 8/2017 | Braasch | H04R 25/552 |
| 2018/0213342 A1 | 7/2018 | Geiger et al. | |
| 2019/0116448 A1* | 4/2019 | Schmidt | H04S 3/008 |
| 2021/0231488 A1* | 7/2021 | Pang | G01H 7/00 |

FOREIGN PATENT DOCUMENTS

| | | | |
|---|---|---|---|
| JP | H0643890 A | 2/1994 | |
| JP | H06110485 A | 4/1994 | |

(Continued)

OTHER PUBLICATIONS

Rama Ratnam et al.,"Blind Estimation of reverberation time", Mar. 2003, Beckman Institute for Advanced Science and Technology, p. 2877-2888 (Year: 2003).*

(Continued)

*Primary Examiner* — Alexander Krzystan
(74) *Attorney, Agent, or Firm* — Leydig, Voit & Mayer, Ltd.

(57) ABSTRACT

The invention relates to the technical fields of binaural audio rendering and, to this end, estimation of room acoustic parameters like reverberation time. In particular, the invention provides a device and method for estimating such acoustic parameters. The device is configured to record an acoustic signal, particularly a speech signal, to estimate a frequency-dependent reverberation time in a lower frequency range based on the recorded acoustic signal, and to extend the frequency-dependent reverberation time to a higher frequency range based on a predetermined model to obtain an extended frequency-dependent reverberation time. Virtual 3D audio can thus be adapted to a real room.

16 Claims, 23 Drawing Sheets

(56) References Cited

FOREIGN PATENT DOCUMENTS

| | | | |
|---|---|---|---|
| JP | 2009211021 | A | 9/2009 |
| JP | 2015064597 | A | 4/2015 |
| WO | 2011057868 | A1 | 5/2011 |
| WO | 2017136573 | A1 | 8/2017 |
| WO | 2017185663 | A1 | 11/2017 |

OTHER PUBLICATIONS

Lindau et al., "Perceptual Evaluation of Model- and Signal-Based Predictors of the Mixing Time in Binaural Room Impulse Responses," J. Audio Eng. Soc., vol. 60, No. 11, pp. 887-898 (Nov. 2012).

Jeub et al., "A Binaural Room Impulse Response Database for the Evaluation of Dereverberation Algorithms," DSP 2009, total 5 pages, IEEE, Institute of Electrical and Electronics Engineers, New York, New York (2009).

Hidaka et al., "A new definition of boundary point between early reflections and late reverberation in room impulse response," Forum Acusticum 2005 Budapest, total 4 pages (2007).

Wen et al., "Blind Estimation of Reverberation Time Based on the Distribution of Signal Decay Rates," ICASSP 2008, pp. 329-332, IEEE, Institute of Electrical and Electronics Engineers, New York, New York (2008).

Löllmann et al., "An Improved Algorithm for Blind Reverberation Time Estimation," International Workshop on Acoustic Echo and Noise Control (IWAENC),Tel Aviv, Israel, total 4 pages (Aug. 2010).

Löllmann et al., "Estimation of the Reverberation Time in Noisy Environments," Proceedings of the International Workshop on Acoustic Echo and Noise Control (IWAENC), Seattle, total 4 pages (2008).

Jot et al., "Augmented Reality Headphone Environment Rendering," Conference Paper, Audio Engineering Society, AES Conference on Audio for Virtual and Augmented Reality, total 6 pages, Los Angeles, CA, USA (Sep. 30-Oct. 1, 2016).

Murgai et al., "Blind Estimation of the Reverberation Fingerprint of Unknown Acoustic Environments," Convention Paper 9905, Audio Engineering Society, AES 143rd Convention, New York, NY, USA, total 6 pages (Oct. 18-21, 2017).

Kuster et al., "Reliability of estimating the room volume from a single room impulse response," J Acoust. Soc. Am. 124 (2), pp. 982-993, Acoustical Society of America (Aug. 2008).

* cited by examiner

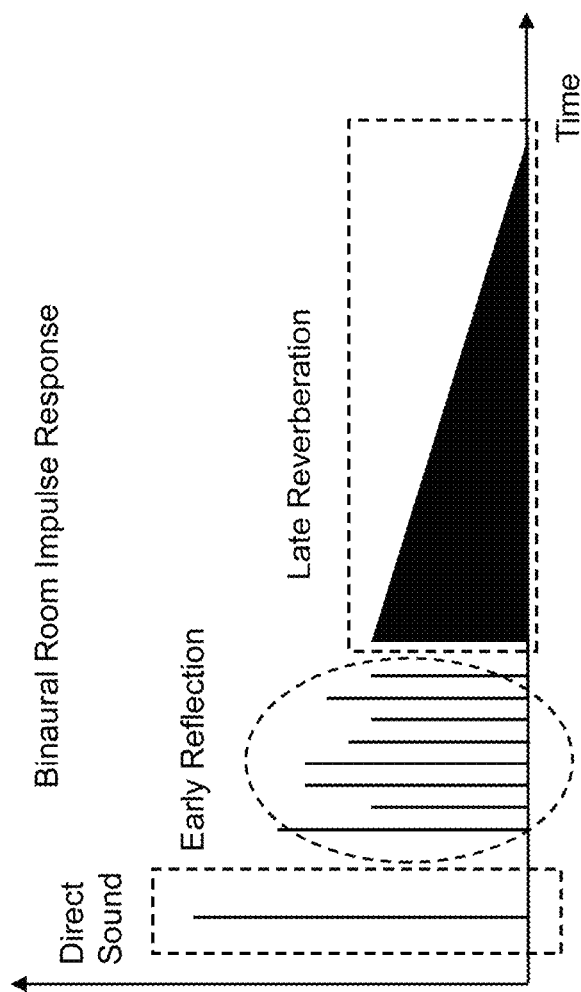

DEVICE AND METHOD FOR ADAPTATION OF VIRTUAL 3D AUDIO TO A REAL ROOM

CROSS-REFERENCE TO RELATED APPLICATIONS

This application is a continuation of International Application No. PCT/EP2018/075194, filed on Sep. 18, 2018, the disclosure of which is hereby incorporated by reference in its entirety.

TECHNICAL FIELD

Embodiments of the invention relate to the technical fields of binaural audio rendering and, to this end, to the estimation of acoustic parameters of a room, like reverberation time and mixing time. In particular, embodiments of the invention provide a device and method for estimating such room acoustic parameters. The device and method are thus for adapting virtual 3D Audio to the real room. Products targeted by the invention are, for instance, augmented-reality (AR) applications with headphones, headphone surround sound on mobile devices (smartphones or tablets), teleconferences with smartphones or single/multiple remote user(s).

BACKGROUND

Binaural Room Impulse Responses (BRIRs) are necessary to create immersive 3D audio signals over headphones. The BRIRs depend not only on the persons, but also on the rooms. As is shown in FIG. 23, a BRIR consists of the direct sound part, early reflections and late reverberation (on a time axis). The direct sound part is important for sound source localization. The early reflections provide spatial information, and are essential for perception of distance and externalization of sound sources. The late reverberation provides room information to listeners, which consists of a high density of reflections, and no longer depends on the position of sound sources.

Measuring the BRIRs for each user in common consumer scenarios is difficult and impractical, due to practical obstacles and complexities. For this reason, a set of synthesized BRIRs, e.g., based on a general head-related transfer function (HRTF) and artificial reverberation, physical room acoustic modeling, etc., or a set of reference BRIRs are usually used for binaural rendering, instead of measured BRIRs.

However, the perceived externalization and plausibility may be reduced when applying synthesized BRIRs without knowledge of the actual room acoustics for binaural rendering. This is due to the fact that the perceived auditory impression relies on the external sound stimuli, but also depends on the expectations about the auditory event in the actual room due to different room acoustics. It is thus important that the acoustic parameters in the actual real room are estimated as precisely as possible. One important acoustic parameter is the reverberation time (also RT60).

A number of conventional solutions regarding generally room adaptation of virtual 3D audio, and specifically estimation of reverberation time are known.

WO 2017185663 A1 uses the microphone and speaker of a smart device (e.g., Virtual Reality (VR) headset, smartphone, etc.) to measure a room impulse response (RIR) in an actual room, and then combine it with a pre-selected HRTF to render 3D audio. Thereby, the virtual acoustics can be adapted to the acoustics of the real actual room. However, the measurement is difficult to perform in common consumer scenarios, since the requirements of microphone and speaker in the device, and of the listening environment are relative high (noise floor, frequency responses, background noise of environment, signal-to-noise ratio (SNR) of recorded signal, etc.). Therefore, disadvantages of this approach are that:
  Measuring the RIR directly requires a quiet environment and relative good equipment (very high SNR).
  In the synthesis part, the RIR response is truncated based on the length of the pre-selected HRTF, and the mixing time is fixed and not room related.

Instead of directly using a measured RIR as in the above approach, WO 2017136573 A1 proposes an approach for extending 3D audio rendering algorithms to match local environment acoustics by using static room parameters. For that, the reverberation fingerprint (volume and the frequency-dependent reverberation time) of the actual room is measured, and compared to the reverberation fingerprint of a reference room (already pre-measured). After that, the BRIR of the actual room can be reshaped based on the reference BRIR and the reverberation fingerprint of the actual and reference room. This idea aims to adapt the virtual 3D audio to real acoustic environment. However, disadvantages of this approach are that:
  The measurement of the room volume and the frequency-dependent reverberation time is difficult in common consumer scenarios, since most consumers may not have the hardware or technical knowledge to measure the reverberation time. An additional device or software to measure the room volume is thus needed. In addition, a quiet environment and relative good equipment are needed to perform the measurement of reverberation time.

Conventional methods of estimating the reverberation time are typically based on measured RIR (Schroeder method) or recorded white noise (Interrupted Method). However, these measurements are difficult to perform in common consumer scenarios, since the requirements of playback, record devices, and listening environment are relative high, and the procedure of the measurement may be difficult for some consumers. To overcome these problems, some blind estimation methods of RT60 based on speech or music signal are proposed. The reverberation can be estimated using speech signal based on the maximum likelihood method/distribution of signal decay rates, etc. In particular, disadvantages of these conventional methods are that:
  These methods are either frequency-independent or frequency-limited up to 8 kHz, due to the frequency ranges of speech signals. In addition, the applied algorithms are not accurate/robust in mid to high frequencies (2-8 kHz) against environment noise.

SUMMARY

In view of the above-mentioned disadvantages, the invention aims to improve the conventional approaches and methods of generally room adaptation of virtual 3D audio, and specifically estimation of reverberation time. An objective of the invention is to provide a device and method for estimating room acoustic parameters faster and more efficiently. In particular, the device and method should be able to precisely estimate a full-band (i.e. not frequency-limited) reverberation time and optionally also a mixing time.

The objective of the invention is achieved by the solution provided in the enclosed independent claims. Advantageous implementations of the invention are further defined in the dependent claims.

In particular, embodiments of the invention obtain the room acoustic parameters by measuring speech signals in an actual room. Then the BRIR can be synthesized based on the estimated acoustic parameters. The synthesized BRIR can further be used in binaural rendering, for instance, for AR applications or headphone surround on mobile devices. Embodiments of the invention are based particularly on a solution for extending a blind estimation of a frequency-dependent reverberation time from lower frequencies to higher frequencies.

A first aspect of the invention provides a device for estimating acoustic parameters, the device being configured to record an acoustic signal, particularly a speech signal, estimate a frequency-dependent reverberation time in a lower frequency range based on the recorded acoustic signal, and extend the frequency-dependent reverberation time to a higher frequency range based on a predetermined model to obtain an extended frequency-dependent reverberation time.

The device of the first aspect does not measure the (room) acoustic parameters (i.e. particularly the reverberation time), but estimates them based on speech recording. Thus, no overly quiet environment and good equipment (very high SNR) are required. The device consequently works well also in noisy environment. Further, prior knowledge of the room geometry and the reverberation time are not necessary. Thus, no additional device or software is needed to measure the room volume. The device of the first aspect differs from conventional methods of estimating the reverberation time, since the extended frequency-dependent reverberation time covers the full frequency range, while the conventional methods are frequency-limited.

In an implementation form of the first aspect, the lower frequency range includes frequencies below 8 kHz, particularly is between 1.4 kHz and 8 kHz, and the higher frequency range includes frequencies above 8 kHz, particularly is between 8 kHz and 18 kHz.

That is, the device is able to obtain a reverberation time even above 8 kHz, unlike the conventional methods for estimating the reverberation time.

In a further implementation form of the first aspect, the device is configured to estimate the frequency-dependent reverberation time in the lower frequency range by performing blind estimation.

Due to the blind estimation based on e.g. speech signal or music signals, measuring a RIR (Schroeder method) or recorded white noise (Interrupted Method) is not required. The reverberation time can instead be estimated using the acoustic signals based on, for example, a maximum likelihood method/distribution of signal decay rates, etc. The major applications are De-reverberation, enhancement of speech intelligibility, etc.

In a further implementation form of the first aspect, the predetermined model describes a reverberation time change from lower frequencies included in the lower frequency range to higher frequencies included in the higher frequency range.

The model can be pre-defined, such that the device can quickly and precisely estimate the extended reverberation time.

In a further implementation form of the first aspect, the device is configured to build the predetermined model by analyzing RIRs of multiple different room types.

Thus, the model includes a precise fingerprint of multiple different room types and geometries, and the device can estimate reverberation time precisely in any room.

In a further implementation form of the first aspect, the device is configured to smooth the frequency-dependent reverberation time over the lower frequency range before extending it to the higher frequency range.

This helps to reduce inaccuracies of the blind estimation caused by environment noises.

In a further implementation form of the first aspect, the device is configured to calculate coefficients for the predetermined model from a single reverberation time of the smoothed frequency-dependent reverberation time at a determined frequency in the lower frequency range, in order to extend it to the higher frequency range based on the predetermined model.

Based on these parameters, the extended reverberation time can be precisely estimated.

In a further implementation form of the first aspect, the device is configured to estimate the frequency-dependent reverberation time in the lower frequency range by: filtering the recorded acoustic signal with a filter bank, and estimating a reverberation time in each of multiple frequency channels of the filtered acoustic signal based on a blind estimation method.

For instance, a maximum likelihood method or an estimation of power spectral density may be used for the blind estimation method.

In a further implementation form of the first aspect, the device is configured to estimate a mixing time based on the extended frequency-dependent reverberation time.

Accordingly, the device of the first aspect obtains also the mixing time as part of the estimated room acoustic parameters. That is, the mixing time is not fixed and is room related, thus leading to improved results when synthesizing BRIRs.

In a further implementation form of the first aspect, the device is configured to estimate the mixing time by: multiplying a single reverberation time of the extended frequency-dependent reverberation time at a determined frequency in the lower frequency range by a predetermined factor, or calculating a room volume based on the extended frequency-dependent reverberation time and calculating the mixing time based on the room volume.

That is, two ways of obtaining the mixing time are provided, the formed focusing on speed, the latter on precision.

In a further implementation form of the first aspect, the device is configured to synthesize a BRIR based on the extended frequency-dependent reverberation time.

The synthesized BRIR is thus obtained with knowledge of the actual room acoustics and leads to an improved binaural rendering.

In a further implementation form of the first aspect, the device is configured to synthesize the BRIR based further on the mixing time.

This further improved the BRIR in terms of correspondence to the actual room.

In a further implementation form of the first aspect, the device is configured to synthesize the BRIR by: using the extended frequency-dependent reverberation time to synthesize a late reverberation part of the BRIR, and using the mixing time to adjust the start time of the late reverberation part in the synthesized BRIR.

The mixing time is defined by the transition point (in time) from early reflections to late reverberation. Thus a very precise BRIR adapted to the actual room is obtained.

In a further implementation form of the first aspect, the device is configured to synthesize the BRIR by: reshaping white noise or white Gaussian noise according to the extended frequency-dependent reverberation time to synthesize the late reverberation part, truncate the late reverberation part according to the mixing time and a window function, and combine a HRTF for a direct part and/or early reflection with the truncated later reverberation part to obtain the entire BRIR.

A second aspect of the invention provides a method for estimating acoustic parameters, the method comprising: recording an acoustic signal, particularly a speech signal, estimating a frequency-dependent reverberation time in a lower frequency range based on the recorded acoustic signal, and extending the frequency-dependent reverberation time to a higher frequency range based on a predetermined model to obtain an extended frequency-dependent reverberation time.

In an implementation form of the second aspect, the lower frequency range includes frequencies below 8 kHz, particularly is between 1.4 kHz and 8 kHz, and the higher frequency range includes frequencies above 8 kHz, particularly is between 8 kHz and 18 kHz.

In a further implementation form of the second aspect, the method comprises estimating the frequency-dependent reverberation time in the lower frequency range by performing blind estimation.

In a further implementation form of the second aspect, the predetermined model describes a reverberation time change from lower frequencies included in the lower frequency range to higher frequencies included in the higher frequency range.

In a further implementation form of the second aspect, the method comprises building the predetermined model by analyzing RIRs of multiple different room types.

In a further implementation form of the second aspect, the method comprises smoothing the frequency-dependent reverberation time over the lower frequency range before extending it to the higher frequency range.

In a further implementation form of the second aspect, the method comprises calculating coefficients for the predetermined model from a single reverberation time of the smoothed frequency-dependent reverberation time at a determined frequency in the lower frequency range, in order to extend it to the higher frequency range based on the predetermined model.

In a further implementation form of the second aspect, the method comprises estimating the frequency-dependent reverberation time in the lower frequency range by: filtering the recorded acoustic signal with a filter bank, and estimating a reverberation time in each of multiple frequency channels of the filtered acoustic signal based on a blind estimation method.

In a further implementation form of the second aspect, the method comprises estimating a mixing time based on the extended frequency-dependent reverberation time.

In a further implementation form of the second aspect, the method comprises estimating the mixing time by: multiplying a single reverberation time of the extended frequency-dependent reverberation time at a determined frequency in the lower frequency range by a predetermined factor, or calculating a room volume based on the extended frequency-dependent reverberation time and calculating the mixing time based on the room volume.

In a further implementation form of the second aspect, the method comprises synthesizing a BRIR based on the extended frequency-dependent reverberation time.

In a further implementation form of the second aspect, the method comprises synthesizing the BRIR based further on the mixing time.

In a further implementation form of the second aspect, the method comprises synthesizing the BRIR by: using the extended frequency-dependent reverberation time to synthesize a late reverberation part of the BRIR, and using the mixing time to adjust the start time of the late reverberation part in the synthesized BRIR.

In a further implementation form of the second aspect, the method comprises synthesizing the BRIR by: reshaping white noise or white Gaussian noise according to the extended frequency-dependent reverberation time to synthesize the late reverberation part, truncate the late reverberation part according to the mixing time and a window function, and combine a HRTF for a direct part and/or early reflection with the truncated later reverberation part to obtain the entire BRIR.

With the method of the second aspect and its implementation forms, the advantages and effects described above for the device of the first aspect and its respective implementation forms are achieved.

A third aspect of the invention provides a computer program product comprising program code for controlling a device to perform the method according to the second aspect when the program code is executed by one or more processors of the device.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the invention will be explained in the following description of specific embodiments in relation to the enclosed drawings, in which:

FIG. 23 shows an exemplary BRIR.

DETAILED DESCRIPTION OF EMBODIMENTS

Figure 1:
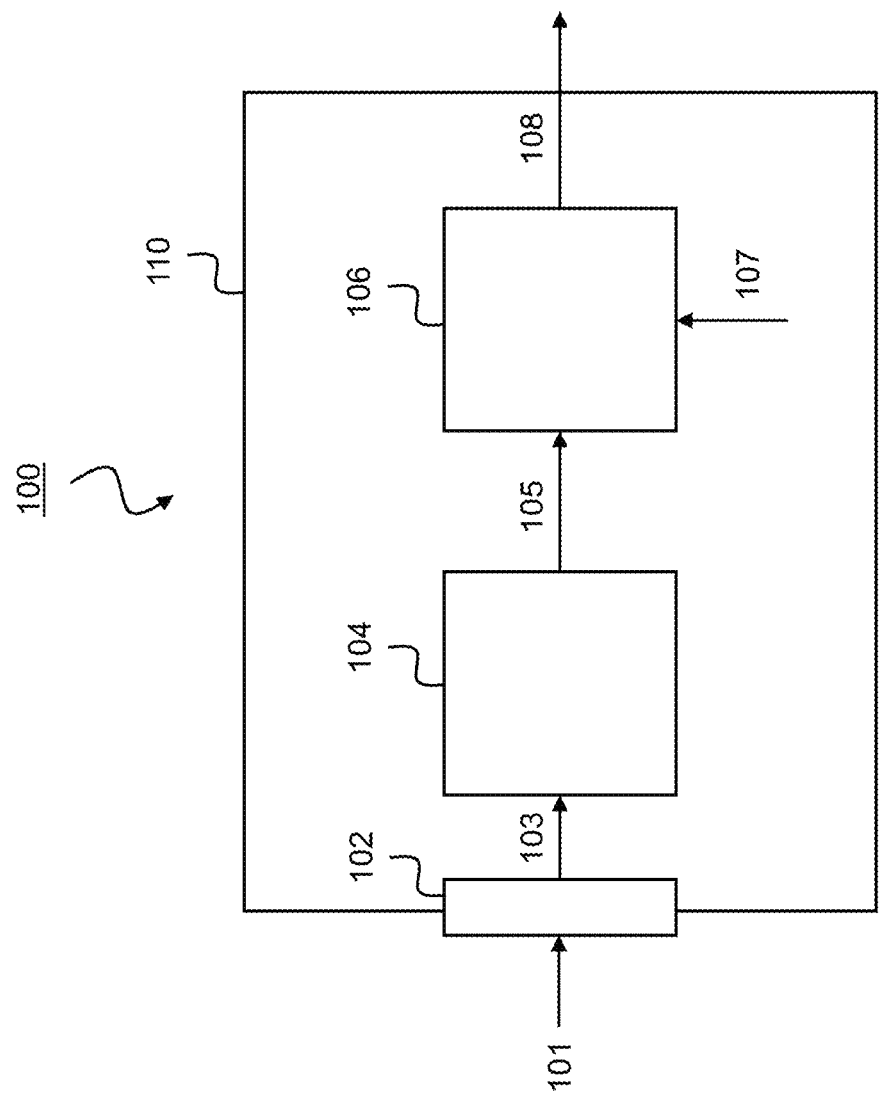
FIG. 1 shows a device according to an embodiment of the invention.

FIG. 1 shows a device 100 according to an embodiment of the invention. The device 100 is configured to estimate room acoustic parameters, in particular a reverberation time of an actual room.

The device 100 may comprise processing circuitry 110 configured to perform the various operations and methods described below. The processing circuitry 110 may comprise hardware and software. In one embodiment, the processing circuitry 110 comprises one or more processors (not shown) and a non-volatile memory (not shown) connected to the one or more processors. The non-volatile memory may carry executable program code which, when executed by the one or more processors, causes the device 100 to perform said operations or methods.

The device 100 is configured to record 102 an acoustic signal 101, particularly a speech signal. The recording 102 may be done by means of a mono microphone, binaural microphone or the like. By recording the acoustic signal 101 it becomes a recorded acoustic signal 103.

The device 100 is further configured to estimate 104 a frequency-dependent reverberation time 105 in a lower frequency range based on the recorded acoustic signal 103. The estimating 104 may be performed by the processing circuitry 110, which may include a filter bank (not shown). The lower frequency range may include frequencies below 8 kHz, for example frequencies between 1.4 kHz and 8 kHz. The estimation 104 may be done by blind estimation.

The device 100 is further configured to extend 106 the estimated frequency-dependent reverberation time 105 for the lower frequency range to a higher frequency range, wherein the extending 106 bases on a predetermined model 107. Thereby, an extended frequency-dependent reverberation time 108 is obtained. The extending 106 may be performed by the processing circuitry 110 which may include one or more smoothing filters (not shown). The higher frequency range may include frequencies above 8 kHz, for example, frequencies between 8 kHz and 18 kHz. The predetermined model 107 may describe a reverberation time change from the lower frequencies included in the lower frequency range to the higher frequencies included in the higher frequency range. The model 107 may be built, by the device 100 or beforehand by another device, by analyzing RIRs of multiple different rooms (types, geometries, sizes).

Figure 2:
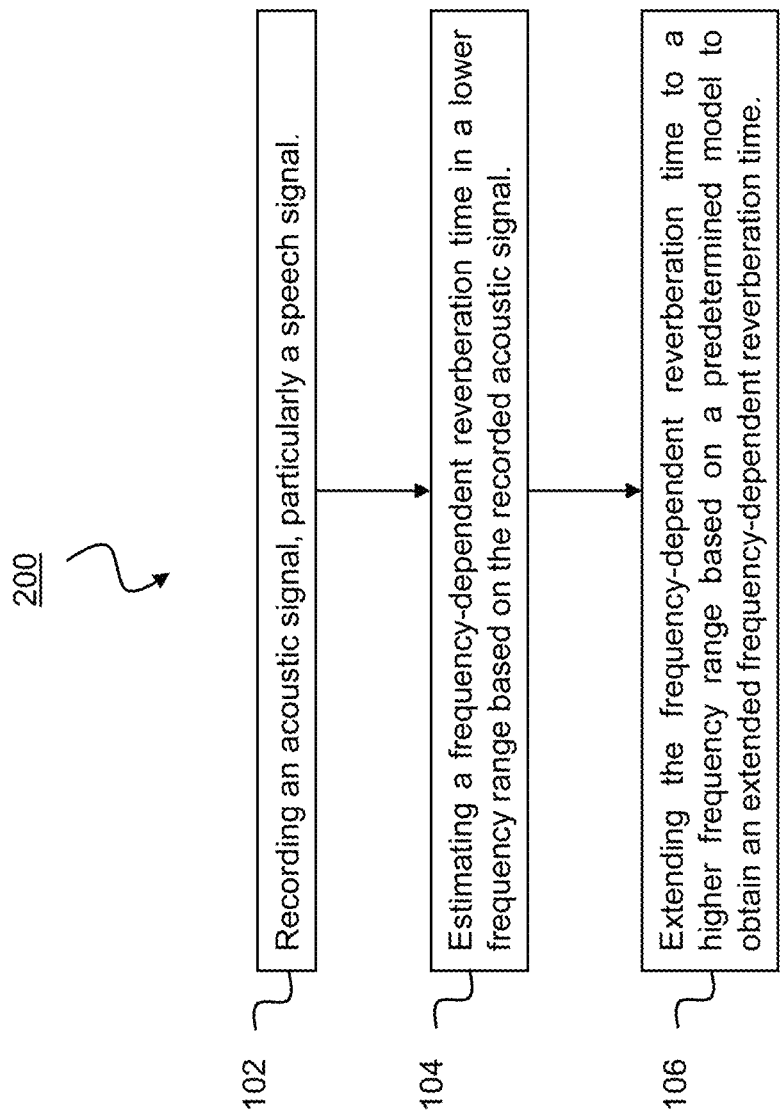
FIG. 2 shows a method according to an embodiment of the invention.

FIG. 2 shows a general method 200 according to an embodiment of the invention for estimating acoustic parameters of a room, particularly the reverberation time. The method 200 may be performed by the device 100 of FIG. 1. The method 200 comprises a first step of recording 102 an acoustic signal 101, particularly a speech signal. Further, it comprises a second step of estimating 104 a frequency-dependent reverberation time 105 in a lower frequency range based on the recorded acoustic signal 103. Further, it comprises a third step of extending 106 the frequency-dependent reverberation time 105 to a higher frequency range based on a predetermined model 107, in order to obtain an extended frequency-dependent reverberation time 108.

More details of the device 100 (and correspondingly the method 200) are described below according to further embodiments of the invention, wherein all embodiments build on the general embodiment of the device 100 shown in FIG. 1. Accordingly, same elements and functions in the various embodiments share the same reference signs.

Figure 3:
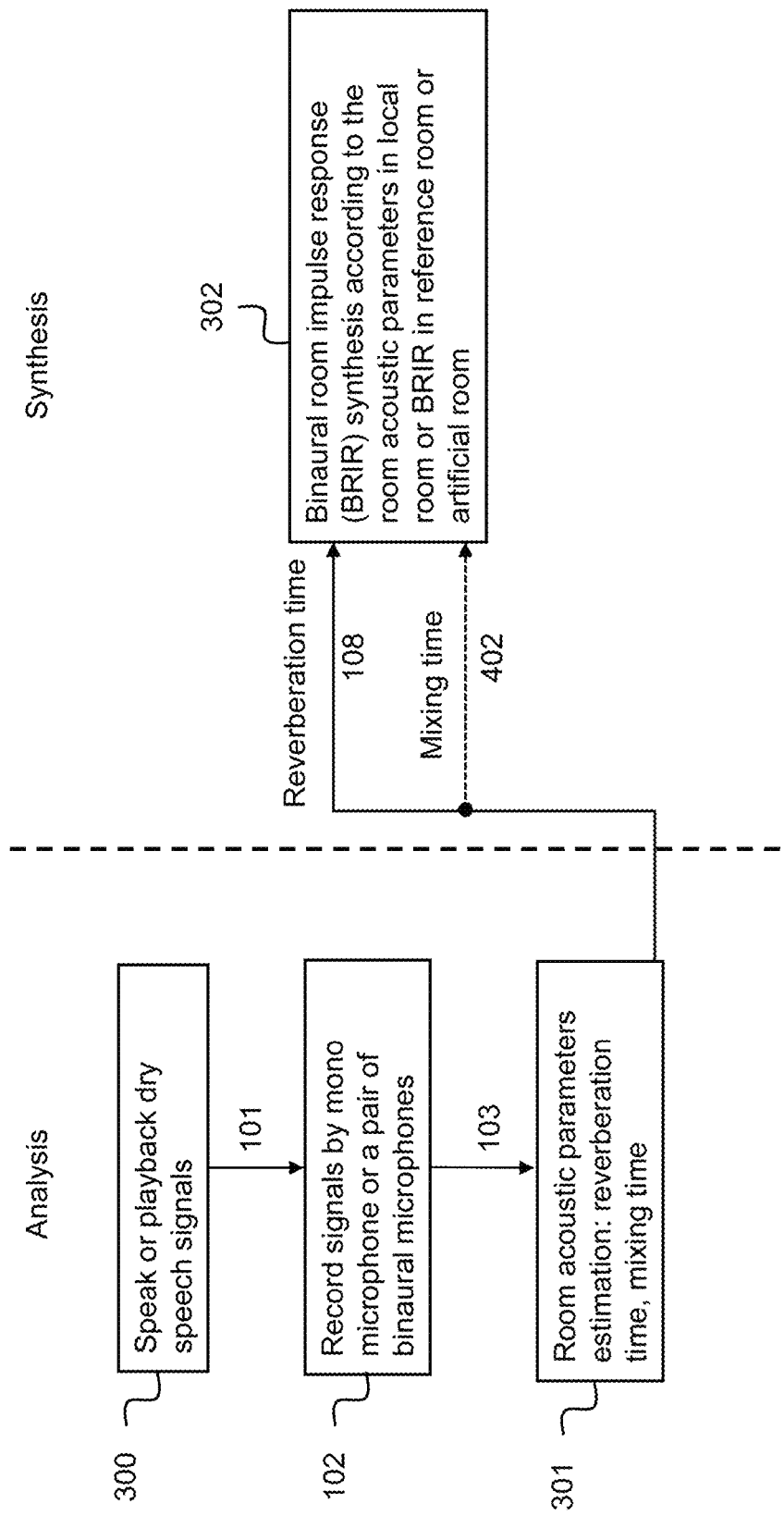
FIG. 3 shows an overview of an analysis part and a synthesis part, respectively, in a device according to an embodiment of the invention.

FIG. 3 shows an overview of an analysis part and a synthesis part, respectively, in a device 100 according to an embodiment of the invention. The analysis part includes a signal playback 300, e.g. of dry speech signal, includes recording 102 of the signal, and includes estimation 301 of room acoustic parameters. The estimation 301 includes the estimation 104 and extension 106 of the reverberation time shown in FIG. 1, i.e. obtains the extended reverberation time 108. The synthesis part includes a synthesis 303 of BRIRs according to the estimated room acoustic parameters, particularly based on the extended reverberation time 108 and optionally on a mixing time 402 (described in detail with respect to FIG. 4). The analysis part can be simply done by a user using microphone(s) on a headset or smart device, and the synthesis part can be performed on the smart device. The details of the analysis part and synthesis part, respectively, are discussed in the following.

Figure 4:
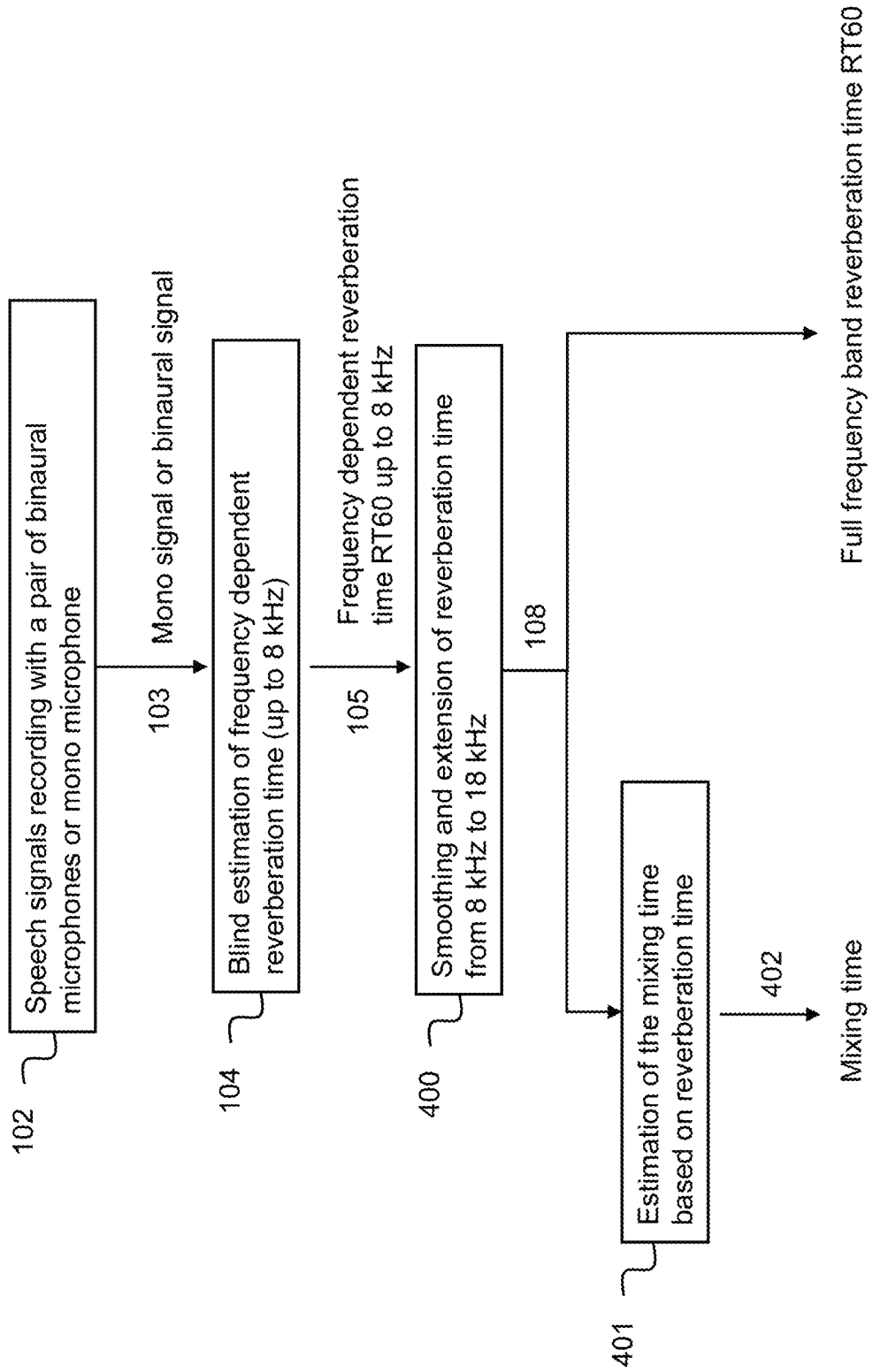
FIG. 4 shows the analysis part in a device according to an embodiment of the invention.

FIG. 4 shows an exemplary overview of the structure of the analysis part of a device 100 according to embodiment of the invention. A piece of speech signal 101 is recorded 102, for instance, with a mono microphone or a pair of binaural microphones. Then the frequency-dependent reverberation time 105 may be blindly estimated 104 based on the recorded signal(s) 103. After that, the estimated reverberation time 105 may be smoothed 400, in FIG. 4 exemplarily from 1.4 kHz to 8 kHz, and is then extended 106 from e.g. 8 to 18 kHz, in order to obtain the extended frequency-dependent reverberation time 108. In addition, the mixing time 402 may be estimated 401 based on the obtained extended reverberation time 108.

Figure 5:
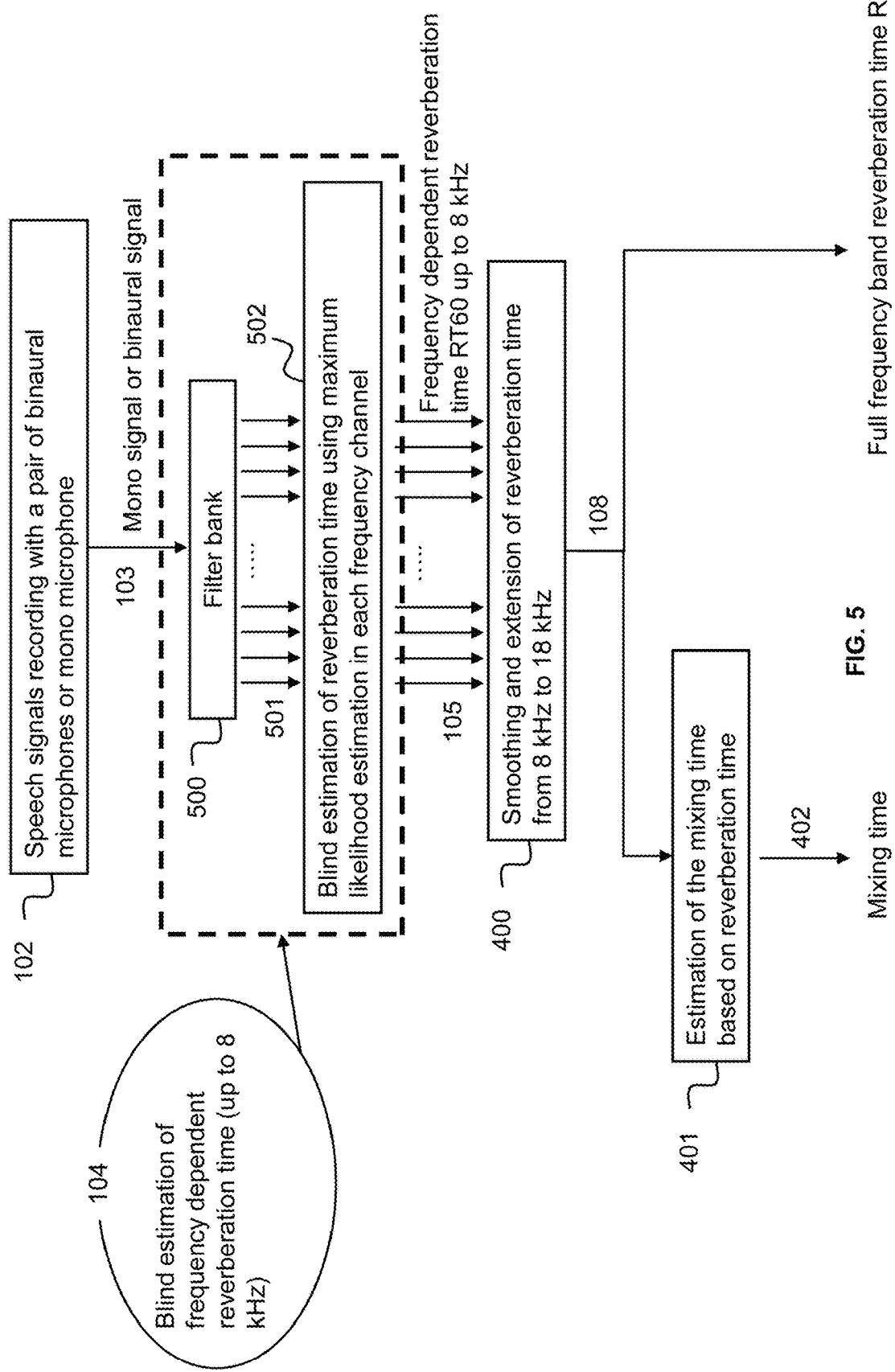
FIG. 5 shows a detailed example of estimating the frequency-dependent reverberation time in a device according to an embodiment of the invention.

An example of the blind estimation 104 shown in FIG. 4 is further illustrated in FIG. 5. To blindly estimate 104 the frequency-dependent reverberation time 105, a piece of speech signals 101 is again recorded 102, for instance, with a mono or a pair of binaural microphones. Then the recorded signals 103 are filtered through a filter bank 500. For example, a gammatone filter bank or a ⅓ octave filter bank may be used. Then, the frequency-dependent reverberation time 105 is estimated using, for example, a maximum likelihood method for the signals in each frequency channel. This may specifically be done as it is described in 'Löllmann and Vary, "*Estimation of the Reverberation Time in Noisy Environment*", Int. Workshop on Acoustic Echo and Noise Control, 2008' or as it is described in 'Löllmann et al., "*An Improved Algorithm for Blind Reverberation Time Estimation*", International Workshop on Acoustic Echo and Noise Control (IWAENC), 2010'.

However, the estimated reverberation time 105 is still frequency-limited up to 8 kHz, due to the frequency range of the speech signals 101. In addition, in the case of a noisy environment, the accuracy of the obtained reverberation time may not be overly robust in low to mid frequencies (e.g., from 1.4 kHz to 8 kHz). Due to the lack of a blindly estimated reverberation time in mid to high frequencies, it would be difficult to exactly synthesize the late reverberation part in a BRIR based on the reverberation time 105. Therefore, the device 100 is further configured to obtain a frequency-dependent reverberation time 108 in a full frequency range (e.g. 1.4-18 kHz). To this end, the device 100 is configured to extend 106 (here smooth and extend 400) the reverberation time 105, in order to obtain the extended frequency-dependent reverberation time 108.

Figure 6:
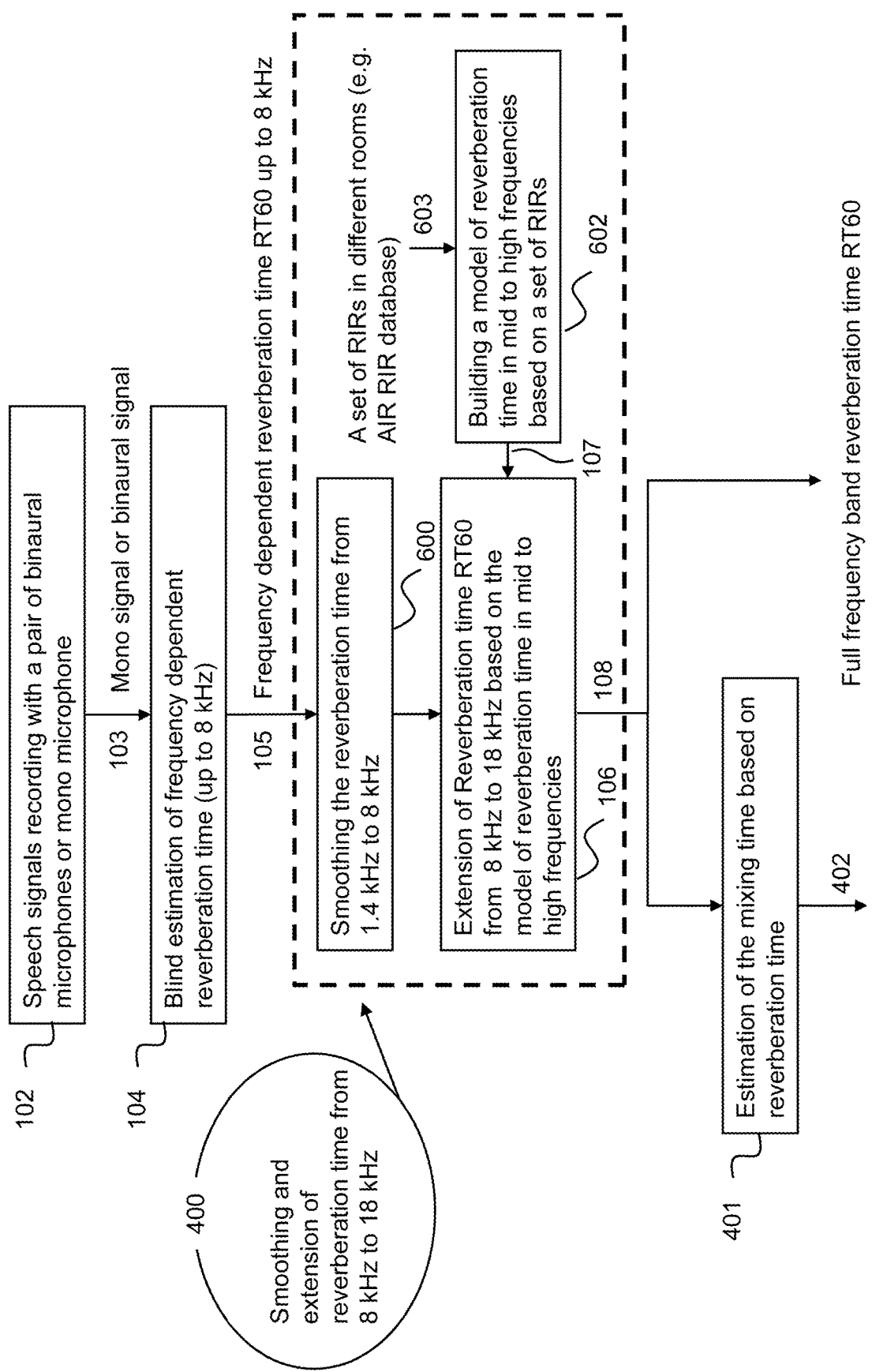
FIG. 6 shows a detailed example of extending the reverberation time to a higher frequency range in a device according to an embodiment of the invention.

FIG. 6 shows an example of extending 106 the reverberation time 105 from mid to high frequencies in a device 100 according to an embodiment of the invention. Through analyzing large databases of RIRs 603, e.g., an AIR RIR dataset, it can be found that the reverberation time changes smoothly from mid to high frequencies. However, in the case of a noisy environment, the accuracy of blindly estimating 104 a reverberation time 105, for example, from 1.4 kHz to 8 kHz, may be somewhat reduced. Therefore, a smoothing filter 600 may be applied to the estimated reverberation time 105, for example, from 1.4 kHz to 8 kHz, in order to reduce the inaccuracies of measurements caused by environment noises. For example, a median filter can be applied to smooth 600 the reverberation time 105, but it is also possible to use another smoothing method or filter. Moreover, through analyzing large databases of RIRs 603, it can also be found that the reverberation time decreases monotonically from mid to high frequencies. Therefore, a model 107 of reverberation time from mid to high frequencies can be built 602 according to the frequency-dependent reverberation time obtained in different rooms (wherein the reverberation time may be calculated using the Schroeder method for RIRs 603 in different rooms from the RIR dataset). The model 107 may particularly be expressed as:

$$T_{60,mid\ to\ high} = a f_{mid\ to\ high}^2 + b f_{mid\ to\ high} + T_{60.4\ kHz} \quad (1)$$

$T_{60,mid\ to\ high}$ is the reverberation time in mid to high frequencies, $T_{60.4\ kHz}$ is the reverberation time at 4 kHz, and $f_{mid\ to\ high}$ denotes mid to high center frequencies of the filter bank 500. The parameter a is usually larger than 0, while b is usually smaller than 0. These parameters can be obtained using the following equations:

$$a = c1 T_{60.4\ kHz}^3 + d1 T_{60.4\ kHz}^2 + e1 T_{60.4\ kHz} + g1 \quad (2)$$

$$b = c2 T_{60.4\ kHz}^3 + d2 T_{60.4\ kHz}^2 + e2 T_{60.4\ kHz} + g2 \quad (3)$$

These equations (Eq. 2 and 3) for calculating the parameters a and b may be determined through analyzing large database of RIRs 603. The parameters c1, c2, d1, d2, e1, e2, g1 and g2 are, for example: 0.003227, -0.03699, -0.006, 0.0581, 0.005581, -0.1155, -0.0005413, 0.008851, which values may be determined based on an AIR RIR database. For an actual real room, the reverberation time at 4 kHz ($T_{60.4\ kHz}$) should first be estimated, then the reverberation time at mid to high frequencies may be calculated based on the model 107 (Eq. 1). It is also possible to use other models 107 (e.g. fitting functions) to calculate the extended reverberation time 108 in mid to high frequencies, e.g., exponential function, higher order polynomial function etc.

In summary, smoothing of the reverberation time 105 from, for example, 1.4 kHz to 8 kHz, may be performed after the blind estimation 104 of the reverberation time 105 using, for instance, the maximum likelihood method. Then, the reverberation time at 4 kHz may be used to calculate the coefficients a and b. After that, the extended reverberation time 108, for example, from 8 kHz to 18 kHz may be obtained based on the proposed model 107 (Eq. 1).

Figure 7:
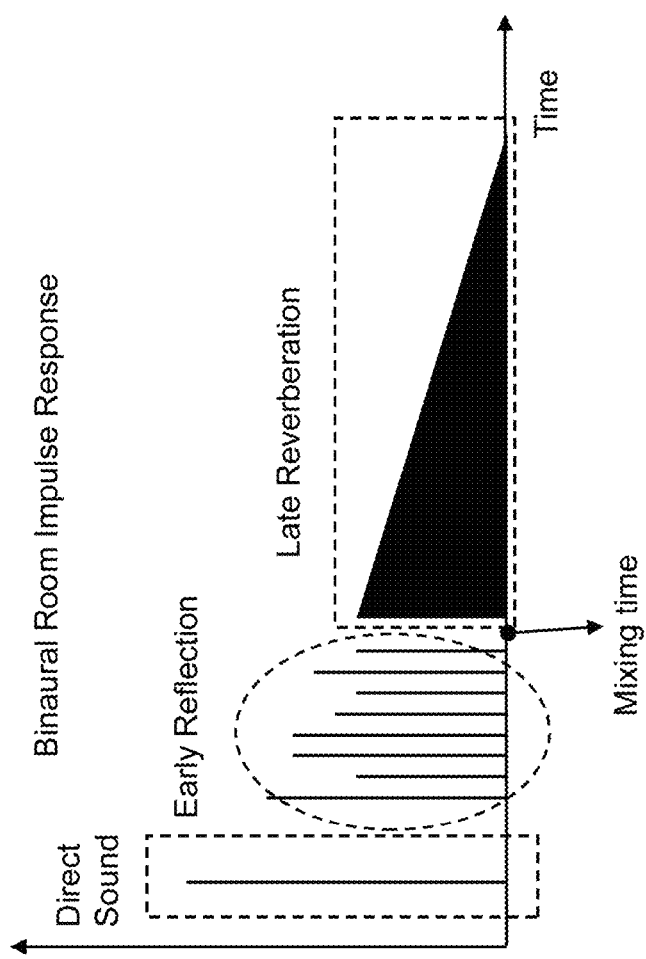
FIG. 7 shows an exemplary BRIR.

The mixing time 402 describes the time of transition from early reflections to late reverberation in RIRs/BRIRs (see FIG. 7 in the exemplary BRIR). A device 100 according to an embodiment of the invention may be further configured to estimate 401 the mixing time 402, in order to adapt the late reverberation part in the synthesized BRIR obtained by using blindly estimated reverberation time 108.

Figure 8:
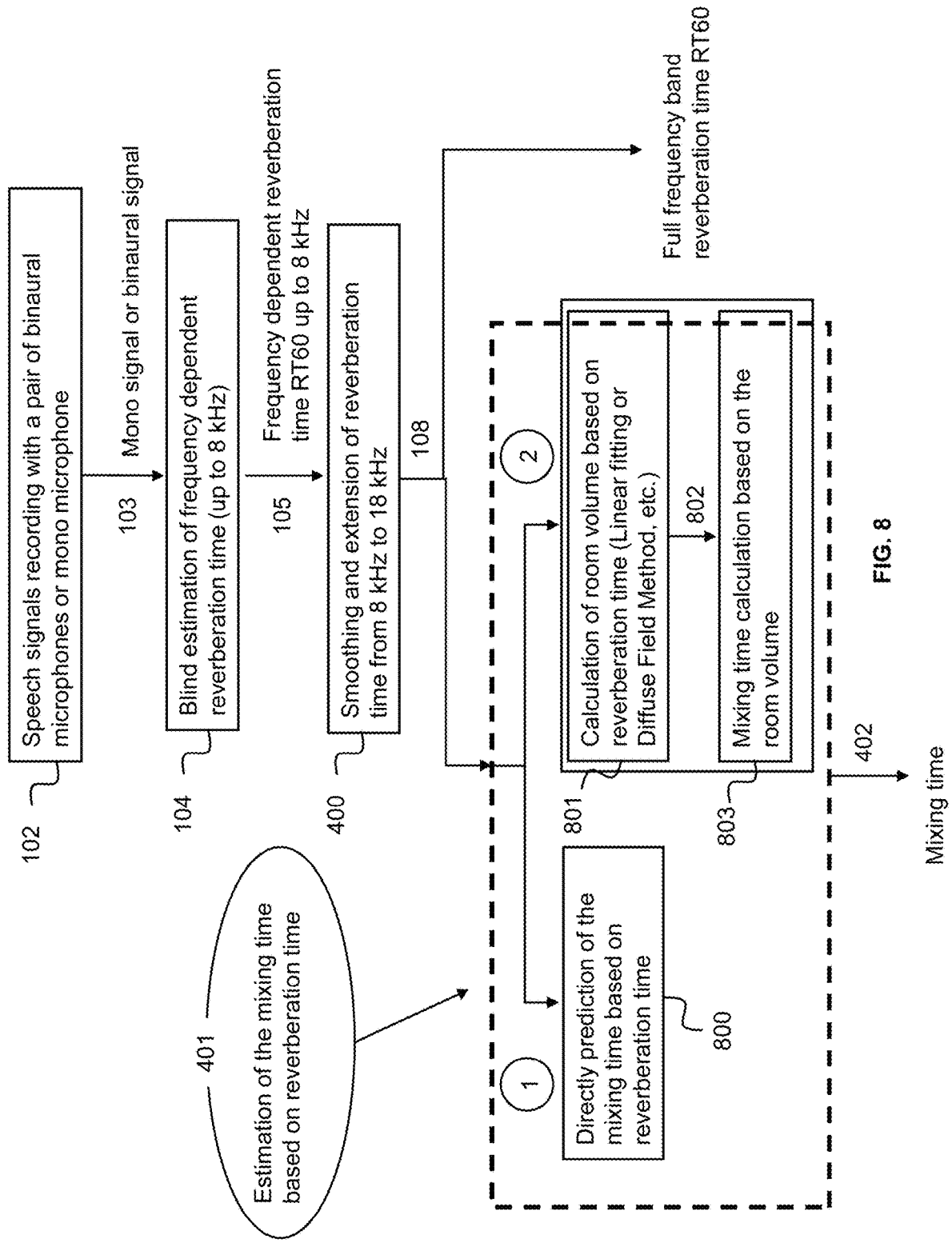
FIG. 8 shows a detailed example of estimating the mixing time in a device according to an embodiment of the invention.

FIG. 8 shows two exemplary ways of calculating the mixing time 402 according to the estimated extended reverberation time 108. In one way, the mixing time is directly predicted 800 based on the reverberation time 108 measured at 500 Hz, which can be approximated as 0.08× reverberation time. This may be done as it is described in 'Hidaka, Yamada, and Nakagawa, "*A new definition of boundary point between early reflections and late reverberation in room impulse responses*" J. Acoust. Soc. Am., Vol. 122, No. 1, pp. 326-332, 2007'. Another way is to first to predict 801 the room volume 802 according to the estimated extended reverberation time 108, which may be done as it is described in 'Kuster, "*Reliability of estimating the room volume from a single room impulse response*" J. Acoust. Soc. Am., vol. 124, no. 2, 2008', and then to calculate 803 the mixing time 402 based on the predicted room volume 802, which may be done as it is described in Lindau et al. "*Perceptual evaluation of model-and signal-based predictors of the mixing time in binaural room impulse responses*", J. Audio Engineering Society, vol. 60, 2012'.

Based on the estimated room acoustic parameters of the actual room (e.g., frequency-dependent extended reverberation time 108 and optionally the mixing time 402), it is possible to synthesize BRIRs, which adapt very well to the actual room.

Figure 9:
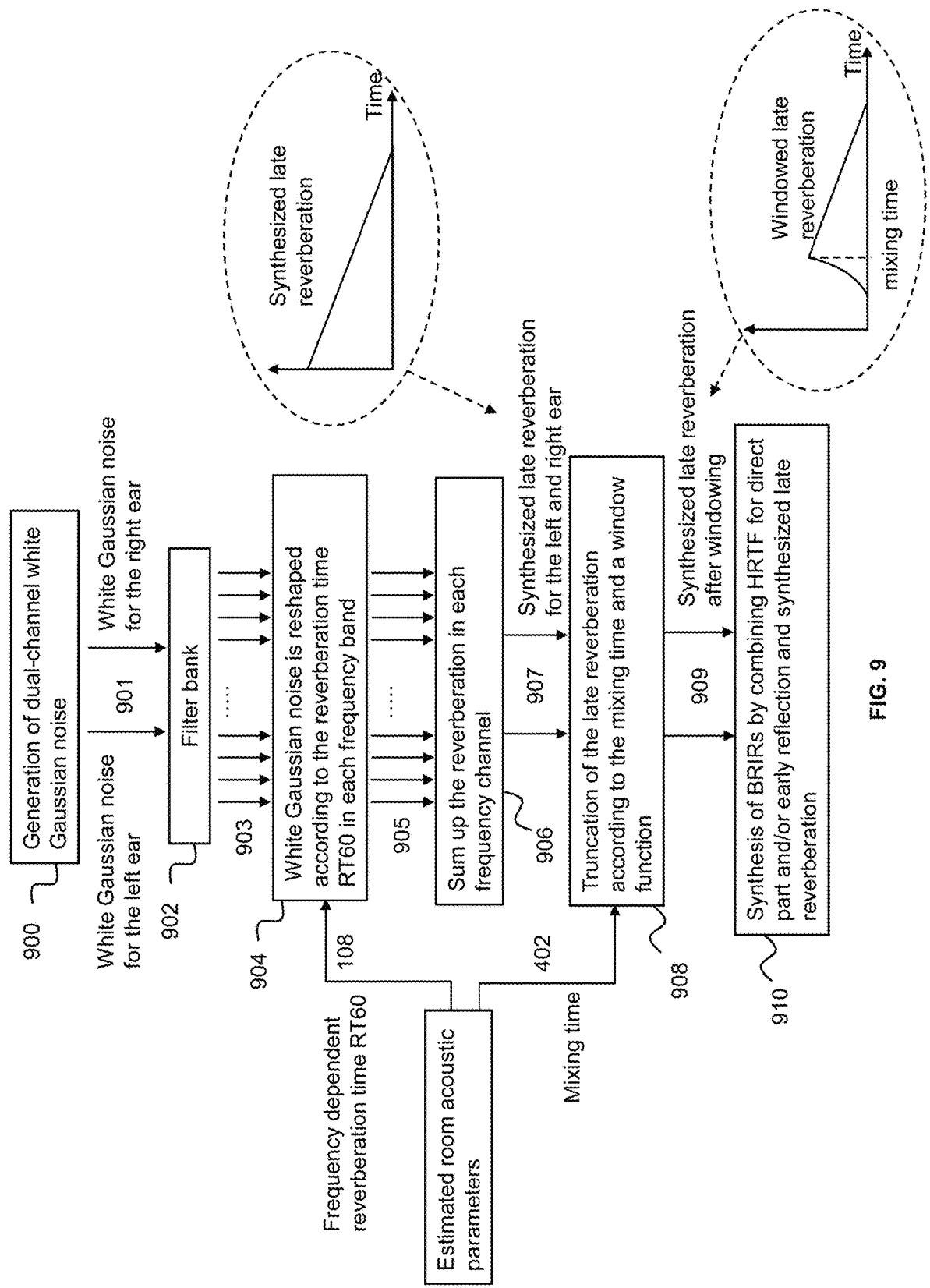
FIG. 9 shows a detailed synthesis part in a device according to an embodiment of the invention.

An example of how to synthesize the BRIRs in a device 100 according to an embodiment of the invention is shown in FIG. 9. The frequency-dependent extended reverberation time 108 is used to synthesize the late reverberation part 907 in BRIRs, and the mixing time 402 may be used to adapt the late reverberation to the BRIRs.

In particular, as shown in FIG. 9, a pair of dual-channel white Gaussian noise 901 (for the left and right ear) may first be filtered through a filter bank 902. It may be advantageous to use a filter bank 902 similar or identical to the filter bank 500, which is applied for the analysis part, i.e. the reverberation time estimation. Then, the filtered white Gaussian noise 903 may be reshaped 904 according to the frequency-dependent reverberation time 108 in each frequency channel. For example, the filtered white Gaussian noise 901 can be reshaped 904 by multiplying with an exponential function h(f), and the decay rate of this exponential function ρ(f) depends on the reverberation time:

$$h(f) = Ae^{-\rho(f)n/f_s} \text{ with } \rho(f) = \frac{3}{T_{60}(f)\log_{10}(e)} \quad (4)$$

A is the scaling factor of the late reverberation, which depends on the source-listener distance, and is usually limited between 0 and 1. Further, n is the sample number, and $f_s$ is the sampling frequency. For example, A, n, and $f_s$ can be set to 1, 8196 samples, and 48 kHz, respectively. Then, the reshaped Gaussian white noise 905 in each frequency channel may be summed up 906 to obtain the synthesized reverberation 907 for the left and right ear.

After that, the obtained reverberation 907 can be further truncated 908 by a window based on the estimated mixing time 402 to adapt to the synthesized BRIRs. To guarantee smooth transitions between early reflections and late reverberation without perceptible artefacts, a window for example with 10 ms long rise time may be applied to truncate 908 the synthesized late reverberation. Thereby, a synthesized late reverberation 909 after windowing is obtained, based on which the BRIRs can be synthesized 910.

Figure 10:
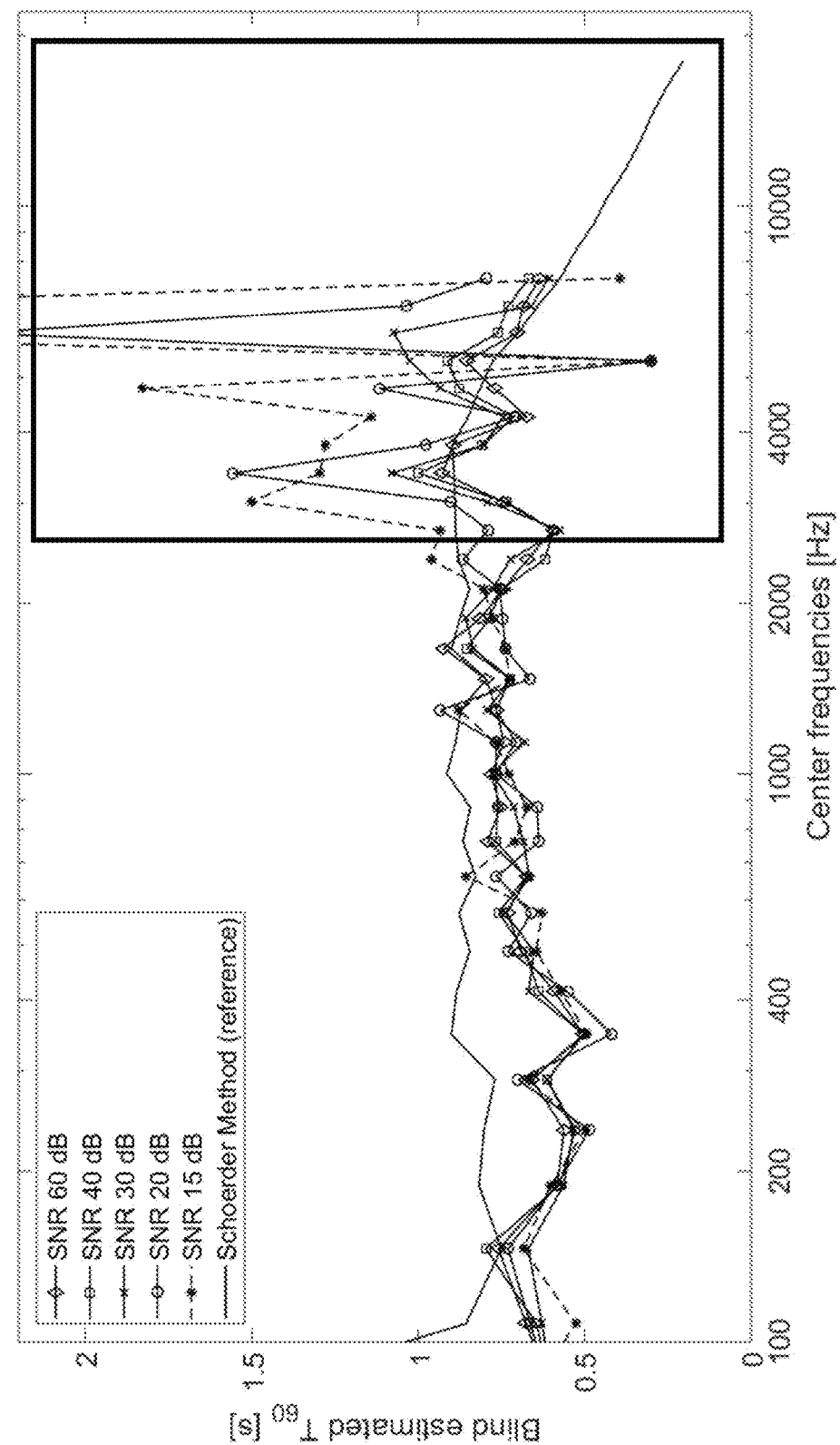
FIG. 10 shows simulated results of estimating the reverberation time using a conventional method.
Figure 11:
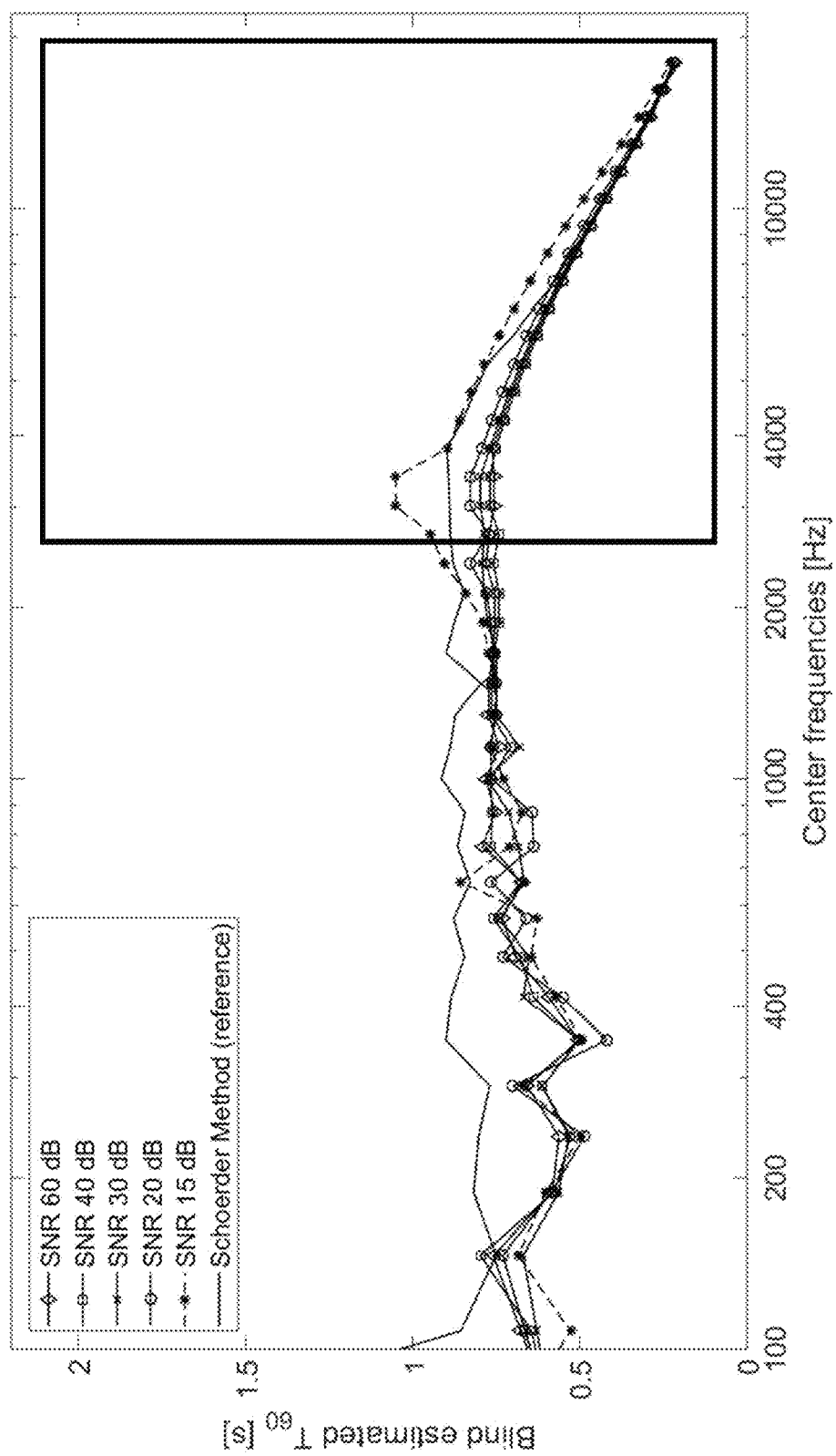
FIG. 11 shows simulated results of estimating the reverberation time in a device according to an embodiment of the invention.

The performance of the device 100 (and correspondingly the method 200) to obtain the full frequency band reverberation time 108 is illustrated by simulation results in FIG. 10 and FIG. 11. For these simulations, a piece of speech signal (sampling frequency 16 kHz) was convolved with a RIR of a lecture room taken from the AIR RIR dataset, as it is described in 'Jeub et al. "A Binaural Room Impulse Response Database for the Evaluation of Dereverberation Algorithms", International Conference on Digital Signal Processing (DSP), 2009' (downsampled to 16 kHz). To simulate the environment noise, white Gaussian noise with different SNRs (15 dB, 20 dB, 30 dB, 40 dB and 60 dB) was added into the reverberant speech signal. 15 dB SNR represents a quite noisy environment, while 60 dB SNR represents a relative quiet environment. The reverberation time calculated by the Schroeder method was used as the baseline (reference). This Schroeder method is based on the analysis of the known RIR 603, and is conventionally used to calculate the reverberation time. In contrast, the device 100 and method 200 according to embodiments of the invention are based on a piece of recorded speech signals 102 without measuring the RIR in the actual room.

FIG. 10 shows particularly the results of a blindly estimated reverberation time using a conventional method. It can be seen that the reverberation time is limited up to 8 kHz, due to the frequency range of the speech signal, and the estimated reverberation time in low to mid frequencies (i.e., e.g., from 1.4 kHz to 8 kHz) is not stable in a noisy environment (low SNRs).

FIG. 11 shows the results of the estimated reverberation time using the device 100 (or correspondingly method 200) according to embodiments of the invention. It is easy to see that the accuracy of the estimated reverberation time for low SNRs is improved by smoothing the reverberation time, here for 1.4 kHz to 8 kHz. In addition, the reverberation time is extended, here from 8 kHz to 18 kHz, and is matched well to the baseline (Schroeder Method).

Figure 12:
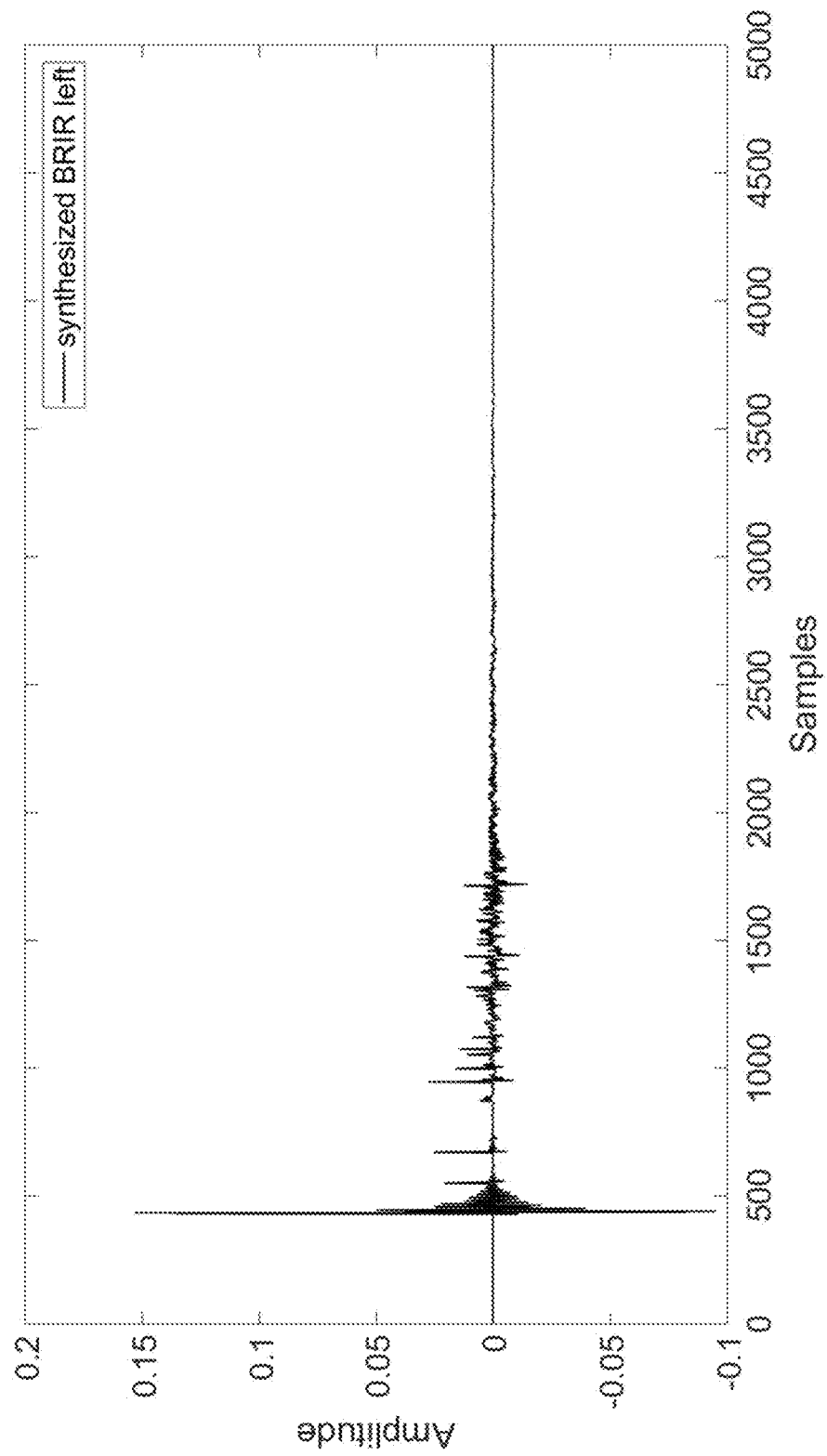
FIG. 12 shows simulated results of synthesizing BRIR in a device according to an embodiment of the invention.

A BRIR can be considered as the sum of direct sound, early reflections and late reverberation. FIG. 12 shows an example of a synthesized BRIR of left ear using generic/non-individual HRTF for direct sound, simulated early reflection and synthesized late reverberation obtained by the device 100 (or correspondingly method 200) according to embodiments of the invention. More details are given below.

In the following, devices 100 according to specific embodiments of the invention are described. The embodiments are divided into two parts: Firstly, analysis of reverberation time (specific embodiments 1 and 2) and, secondly, synthesis of BRIRs (specific embodiments 3, 4 and 5).

Figure 13:
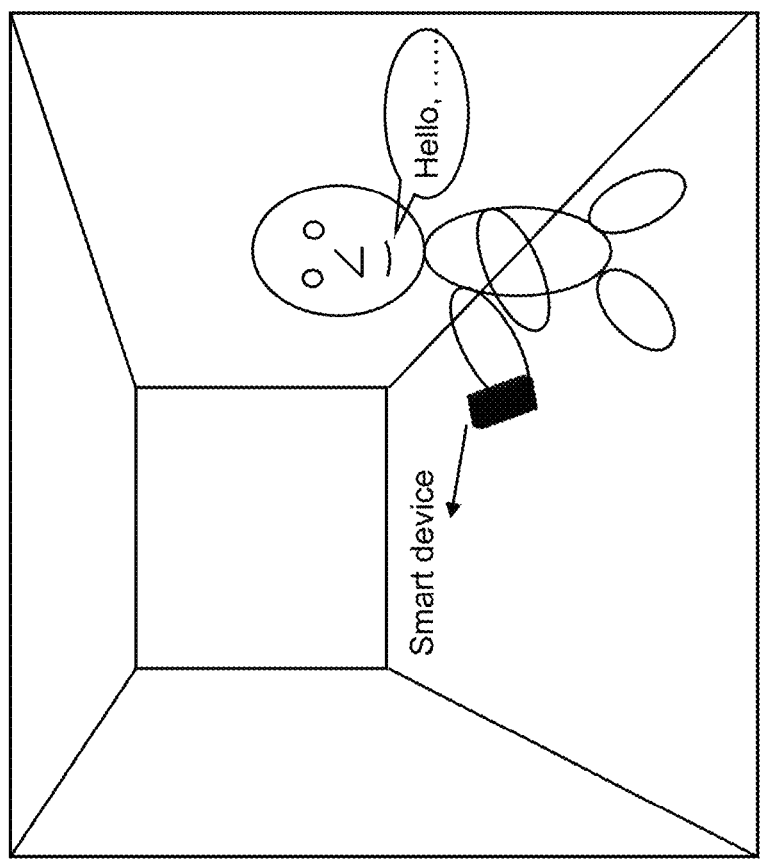
FIG. 13 shows a scenario of using a device according to a first specific embodiment of the invention.
Figure 14:
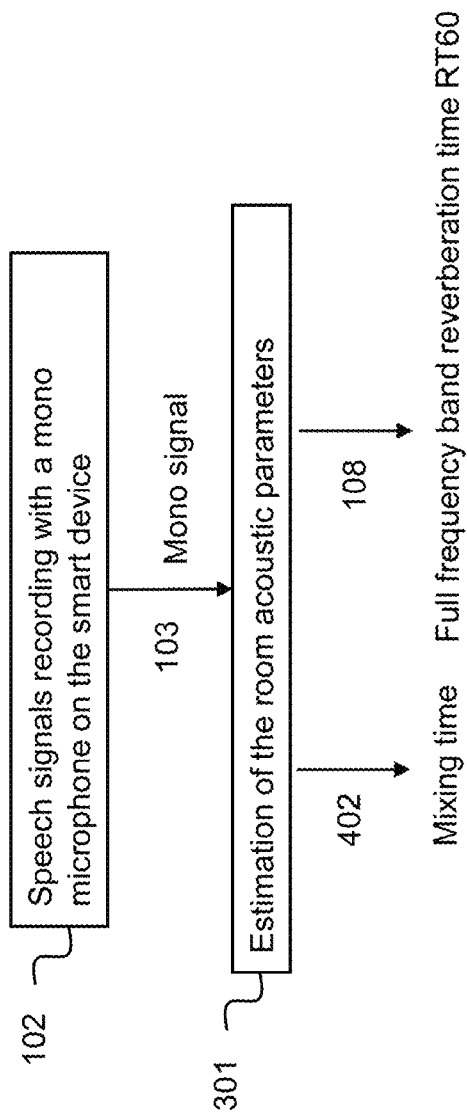
FIG. 14 shows a block diagram for the device according to the first specific embodiment of the invention.

Embodiment 1 is shown in FIG. 13 and FIG. 14, respectively, and bases on an analysis of the reverberation time using a mono microphone. As shown in FIG. 13, the user speaks, for example, some short sentences (10~20 s) and at the same time records sound using the device 100, e.g. a smart device with a microphone (e.g., a smartphone or a tablet) in the actual room. Since the device 100 also works well in quite noisy environment (e.g., SNR 15 dB of the recorded signal), the sound source does not have to be positioned very close to the microphone, and also the environment does not have to be very quiet. The device 100 estimates room acoustic parameters (reverberation time 108, mixing time 402, etc.) based on the recorded sound. The device 100 then synthesizes the late reverberation 907 for the left and the right ear based on the estimated room acoustic parameters (e.g., reverberation time 108 for left and right ears). FIG. 14 shows a block diagram for the device 100 of this embodiment. The details of the block are as described above with respect to FIG. 5, FIG. 6 and FIG. 8.

Figure 15:
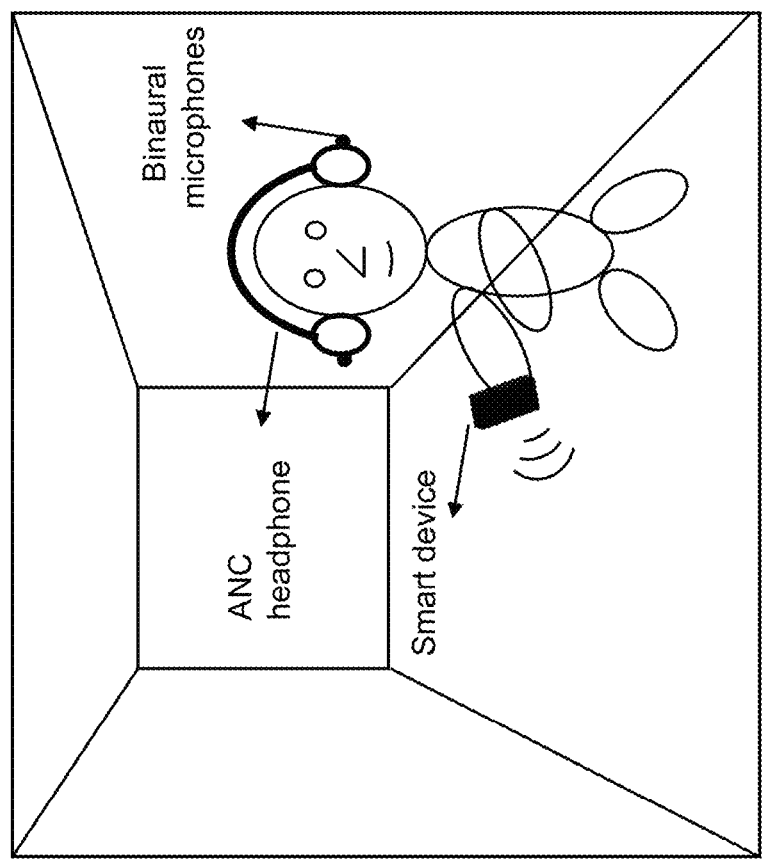
FIG. 15 shows a scenario of using a device according to a second specific embodiment of the invention.
Figure 16:
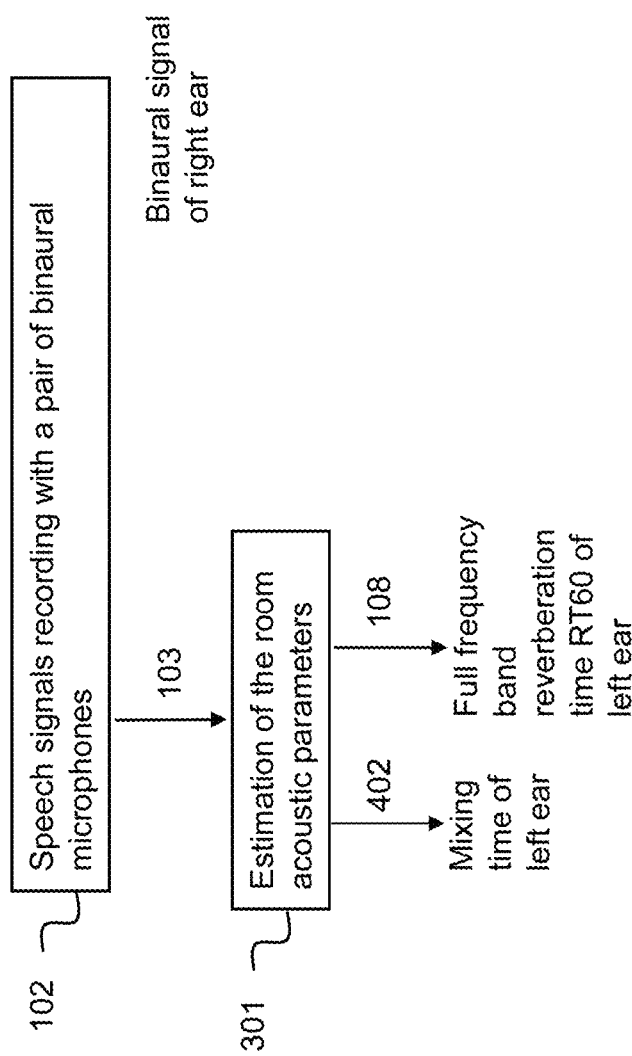
FIG. 16 shows a block diagram for the device according to the second specific embodiment of the invention.

Embodiment 2 is shown in FIG. 15 and FIG. 16, respectively, and bases on an analysis of the reverberation time using a pair of binaural microphones. As shown in FIG. 15, the user may play back a dry speech file on the device 100, e.g. a smart device (e.g., a smartphone or tablet), or may speak some short sentences (10~20 s) in the actual room and at the same time records sound using a pair of binaural microphones, for example, microphones on an Active Noise Control (ANC) headphone. The recorded binaural signals are used by the device 100 to estimate the room acoustic parameters (e.g., reverberation time 108, mixing time 402, etc.) separately for the left and the right ear. The calculated room acoustic parameters for the left and the right ear are further used to synthesize the reverberation 907 for the left and right ears separately. FIG. 16 shows a block diagram for the device 100 of this embodiment. The details of the block are as described above with respect to FIG. 5, FIG. 6 and FIG. 8.

Figure 17:
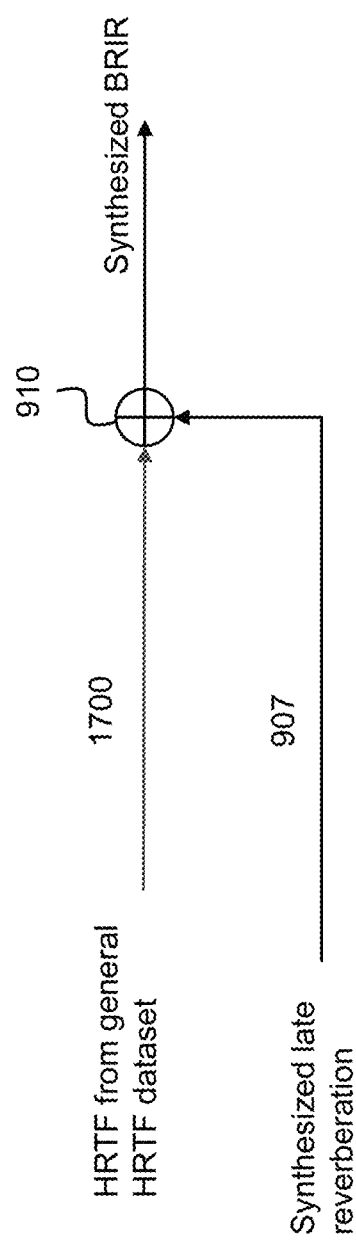
FIG. 17 shows a synthesis of BRIRs using non-individual HRTF and late reverberation in a device according to a third specific embodiment of the invention.
Figure 18:
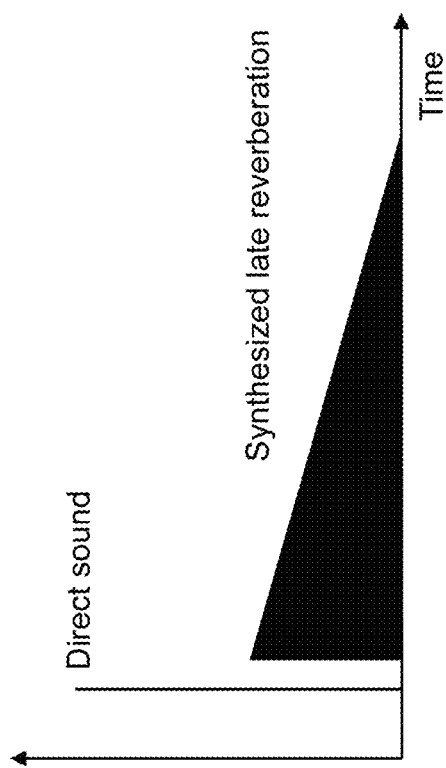
FIG. 18 shows an example of the synthesized BRIR in the third specific embodiment.

Embodiment 3 is shown in FIGS. 17 and 18, respectively, and bases on synthesis of BRIRs using non-individual HRTF and late reverberation. A BRIR can be considered as the sum of direct sound, early reflections and late reverberation. As shown in FIG. 17, the simplest way to synthesize a pair of BRIR is by using and combining 910 the general/non-individual HRTF 1700 for direct sound and the synthesized late reverberation 907. In that way the early reflections are neglected, and there is no need to know the exact mixing time 402. Though the perceived externalization and plausibility may be reduced due to the lack of early reflection, the property of room (size of the room, reverberation of the room, etc.) can still be perceived. FIG. 18 shows the synthesized BRIRs consisting of the direct sound and late reverberation.

Figure 19:
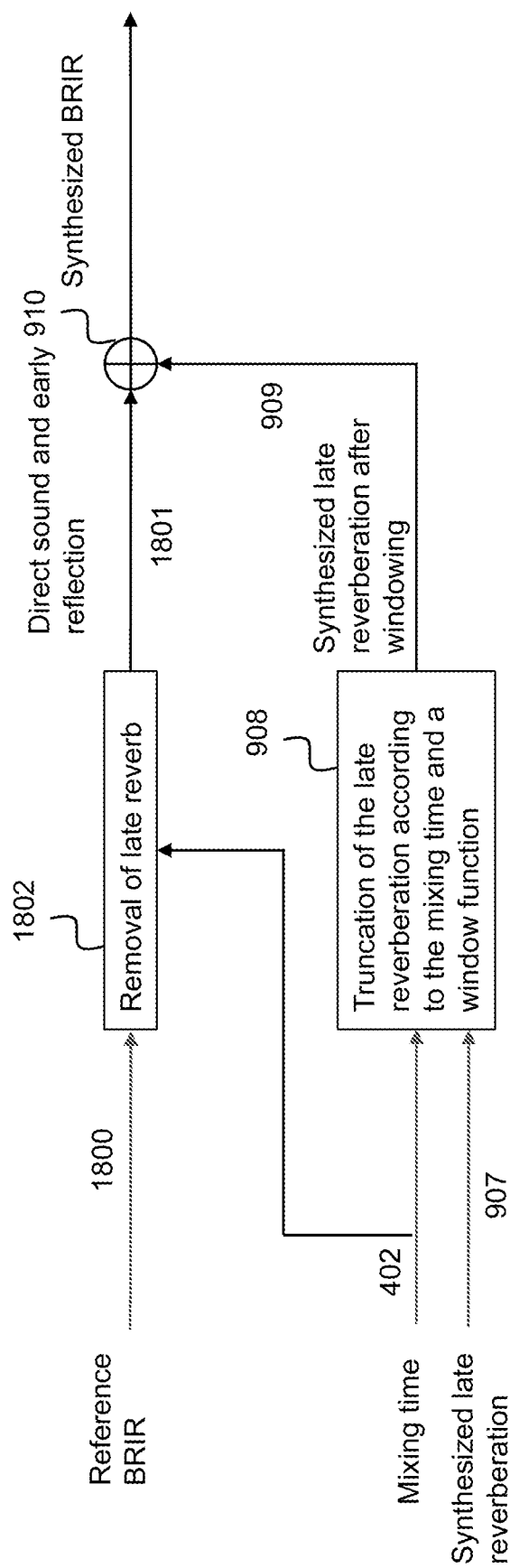
FIG. 19 shows a synthesis of BRIRs using reference BRIR and synthesized late reverberation in a device according to a fourth specific embodiment of the invention.
Figure 20:
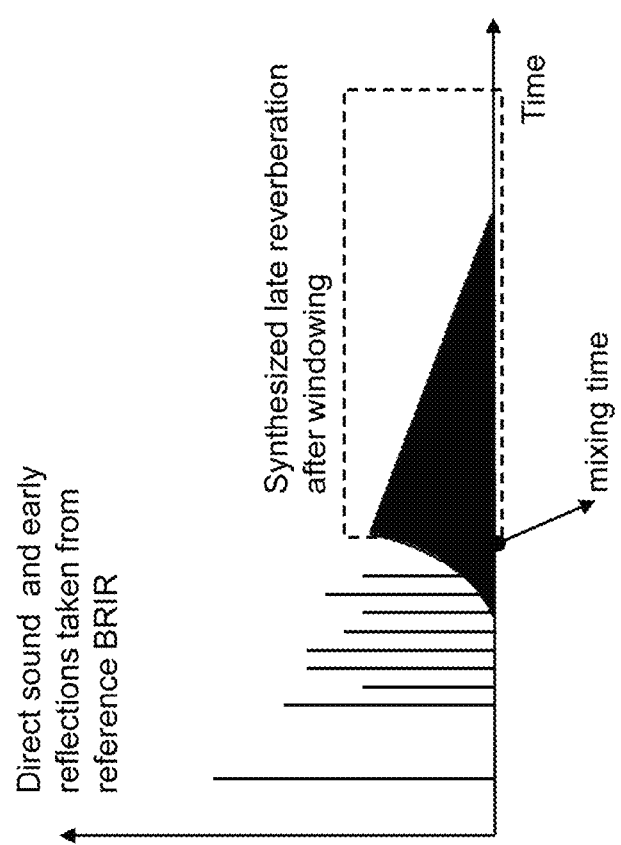
FIG. 20 shows an example of the synthesized BRIR in the fourth specific embodiment of the invention.

Embodiment 4 is shown in FIG. 19 and FIG. 20, respectively, and bases on synthesis of BRIRs using reference BRIR and synthesized late reverberation. Late reverberation provides the room information, which is useful for listeners to perceive the acoustic environment. Early reflections provide spatial information, which are important for externalization of virtual sound sources. In this embodiment, as shown in FIG. 19, a set of reference BRIRs 1800 is used to synthesize 910 the BRIRs in the actual room. In that way, the direct sound and early reflections 1801 are directly taken from the reference BRIRs 1800, and the late reverberation part in the reference BRIRs are removed 1802 and replaced with the synthesized late reverberation 909 after windowing (truncating 908) based on the later reverberation 907 derived from the estimated room acoustic parameters (frequency-dependent reverberation time 108 and mixing time 402). FIG. 20 shows an example of synthesized BRIR based on the reference BRIR 1800 and the synthesized late reverberation 909.

Figure 21:
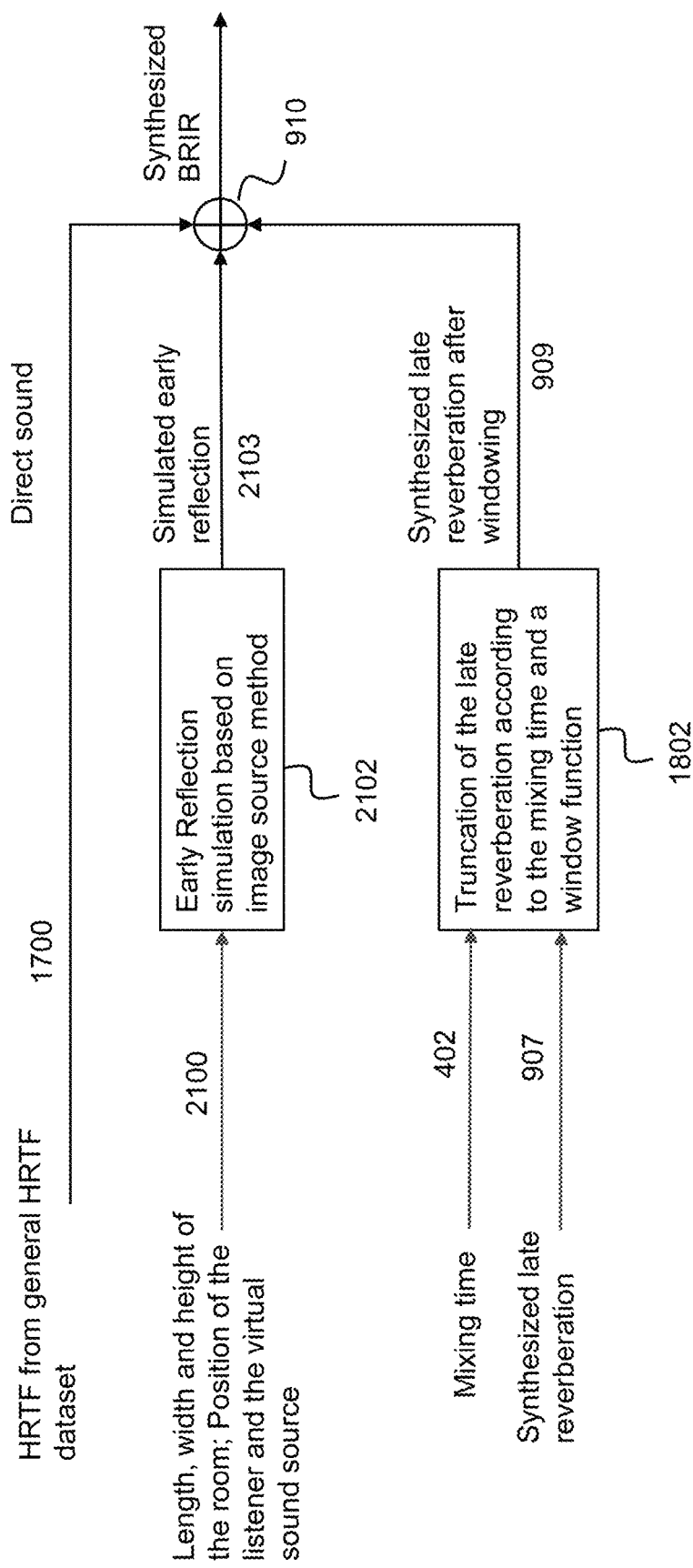
FIG. 21 shows a synthesis of BRIRs using non-individual HRTF, early reflections and late reverberation in a device according to a fifth specific embodiment of the invention.
Figure 22:
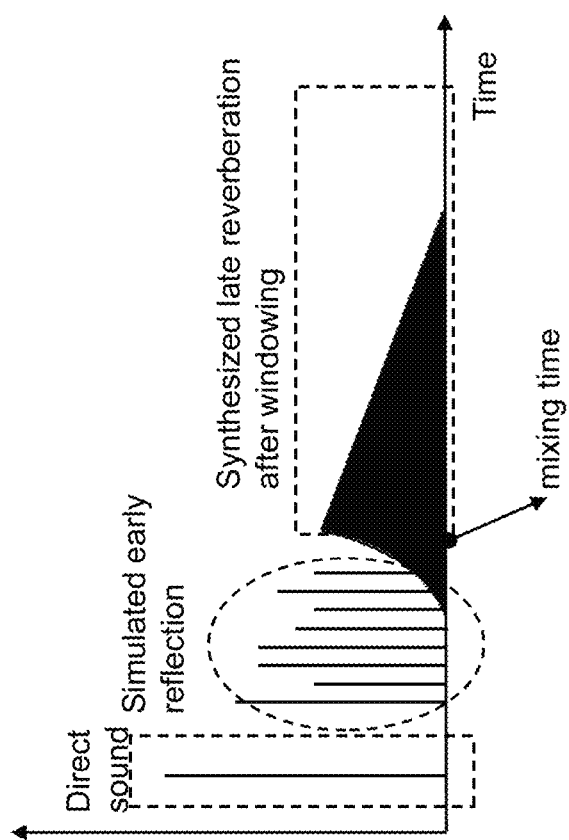
FIG. 22 shows an example of the synthesized BRIR in the fifth specific embodiment of the invention.

Embodiment 5 is shown in FIG. 21 and FIG. 22, respectively, and bases on synthesis of BRIRs using non-individual HRTF, early reflections and late reverberation. In this embodiment, BRIR is considered as the sum of direct sound, early reflections and late reverberation. As shown in FIG. 21, general/non-individual HRTF 1700 is used to generate the direct sound part. Given additional information 2100 of room geometry, position of sound source(s) and listener, general/non-individual HRTF 1700 is also used to simulate 2102 the early reflections 2103. The synthesized late reverberation 909 with actual room acoustic is adapted to the BRIRs.

There are many ways to simulate 2102 the early reflections 2103, e.g., image-source method, ray tracing method, etc. To simulate 2102 the early reflections 2013, the position of sound source and the listener in the room should be first defined by user. In addition, the geometry (length, width, and height) of the room should be either estimated by using external sensor, e.g., AR-headset, or provided by the user. Based on the geometry of the room, position of the listener and the virtual sound source, the early reflections can be simulated for example using image-source method. The number of the image sources depends on the performance of the smart devices. The late reverberation 909 calculated according to the reverberation time 108 is then added into the synthesized BRIR according to the mixing time 402. FIG. 22 shows an example of synthesized BRIR of left ear using this method.

The invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A device for estimating acoustic parameters, wherein the device is configured to:
   record an acoustic signal;
   estimate a frequency-dependent reverberation time in a lower frequency range based on the recorded acoustic signal;
   extend the frequency-dependent reverberation time to a higher frequency range based on a predetermined model to obtain an extended frequency-dependent reverberation time;
   synthesize a Binaural Room Impulse Response (BRIR) based on the extended frequency-dependent reverberation time;
   estimate a mixing time based on the extended frequency-dependent reverberation time; and
   synthesize the BRIR based further on the mixing time, wherein the synthesizing the BRIR based further on the mixing time comprises:
   reshaping white noise or white Gaussian noise according to the extended frequency-dependent reverberation time to synthesize the late reverberation part;
   truncating the late reverberation part according to the mixing time and a window function; and
   combining a Head Related Transfer Function for a direct part and/or early reflection with the truncated later reverberation part to obtain an entire BRIR.

2. The device according to claim 1, wherein:
   the lower frequency range includes frequencies below 8 kHz; and
   the higher frequency range includes frequencies above 8 kHz.

3. The device according to claim 1, wherein the device is further configured to:
   estimate the frequency-dependent reverberation time in the lower frequency range by performing blind estimation.

4. The device according to claim 1, wherein the predetermined model describes a reverberation time change from lower frequencies included in the lower frequency range to higher frequencies included in the higher frequency range.

5. The device according to claim 1, wherein the device is further configured to:
   build the predetermined model by analyzing Room Impulse Responses (RIRs) of multiple different room types.

6. The device according claim 1, wherein the device is further configured to:
   smooth the frequency-dependent reverberation time over the lower frequency range before extending it to the higher frequency range.

7. The device according to claim 6, wherein the device is further configured to:
   calculate coefficients for the predetermined model from a single reverberation time of the smoothed frequency-dependent reverberation time at a determined frequency in the lower frequency range, in order to extend it to the higher frequency range based on the predetermined model.

8. The device according to claim 1, wherein the device is further configured to:
   estimate the frequency-dependent reverberation time in the lower frequency range by:
   filtering the recorded acoustic signal with a filter bank; and
   estimating a reverberation time in each of multiple frequency channels of the filtered acoustic signal based on a blind estimation method.

9. The device according to claim 1, wherein the device is further configured to:
   estimate a mixing time based on the extended frequency-dependent reverberation time.

10. The device according to claim 9, wherein the device is further configured to:
    estimate the mixing time by:
    multiplying a single reverberation time of the extended frequency-dependent reverberation time at a determined frequency in the lower frequency range by a predetermined factor; or
    calculating a room volume based on the extended frequency-dependent reverberation time and calculating the mixing time based on the room volume.

11. The device according to claim 1, wherein the device is further configured to:
  synthesize the BRIR by:
    using the extended frequency-dependent reverberation time to synthesize a late reverberation part of the BRIR; and
    using the mixing time to adjust the start time of the late reverberation part in the synthesized BRIR.

12. A method for estimating acoustic parameters, the method comprising:
  recording an acoustic signal;
  estimating a frequency-dependent reverberation time in a lower frequency range based on the recorded acoustic signal;
  extending the frequency-dependent reverberation time to a higher frequency range based on a predetermined model to obtain an extended frequency-dependent reverberation time;
  synthesizing a Binaural Room Impulse Response (BRIR) based on the extended frequency-dependent reverberation time;
  estimating a mixing time based on the extended frequency-dependent reverberation time; and
  synthesizing the BRIR based further on the mixing time, wherein the synthesizing the BRIR based further on the mixing time comprises:
    reshaping white noise or white Gaussian noise according to the extended frequency-dependent reverberation time to synthesize the late reverberation part;
    truncating the late reverberation part according to the mixing time and a window function; and
    combining a Head Related Transfer Function for a direct part and/or early reflection with the truncated later reverberation part to obtain an entire BRIR.

13. A non-transitory computer readable medium comprising program code that when executed by a computer, configure the computer to perform a method comprising:
  recording an acoustic signal;
  estimating a frequency-dependent reverberation time in a lower frequency range based on the recorded acoustic signal;
  extending the frequency-dependent reverberation time to a higher frequency range based on a predetermined model to obtain an extended frequency-dependent reverberation time;
  synthesizing a Binaural Room Impulse Response (BRIR) based on the extended frequency-dependent reverberation time;
  estimating a mixing time based on the extended frequency-dependent reverberation time; and
  synthesizing the BRIR based further on the mixing time, wherein the synthesizing the BRIR based further on the mixing time comprises:
    reshaping white noise or white Gaussian noise according to the extended frequency-dependent reverberation time to synthesize the late reverberation part;
    truncating the late reverberation part according to the mixing time and a window function; and
    combining a Head Related Transfer Function for a direct part and/or early reflection with the truncated later reverberation part to obtain an entire BRIR.

14. The device according to claim 1, wherein the extended frequency-dependent reverberation time is determined further based on the frequency-dependent reverberation time in the lower frequency range.

15. The method according to claim 12, wherein the extended frequency-dependent reverberation time is determined further based on the frequency-dependent reverberation time in the lower frequency range.

16. The non-transitory computer readable medium according to claim 13, wherein the extended frequency-dependent reverberation time is determined further based on the frequency-dependent reverberation time in the lower frequency range.

* * * * *

UNITED STATES PATENT AND TRADEMARK OFFICE
CERTIFICATE OF CORRECTION

PATENT NO. : 11,668,600 B2  
APPLICATION NO. : 17/205916  
DATED : June 6, 2023  
INVENTOR(S) : Pang et al.

Page 1 of 1

It is certified that error appears in the above-identified patent and that said Letters Patent is hereby corrected as shown below:

In the Claims

Claim 6: Column 14, Line 32: "The device according claim 1, wherein the device is" should read -- The device according to claim 1, wherein the device is --.

Claim 8: Column 14, Line 49: "filtering the recorded acoustic signal with a filter bank;" should read -- - filtering the recorded acoustic signal with a filter bank; --.

Claim 8: Column 14, Line 51: "estimating a reverberation time in each of multiple" should read -- - estimating a reverberation time in each of multiple --.

Claim 10: Column 14, Line 61: "multiplying a single reverberation time of the extended" should read -- - multiplying a single reverberation time of the extended --.

Claim 10: Column 14, Line 65: "calculating a room volume based on the extended" should read -- - calculating a room volume based on the extended --.

Claim 11: Column 15, Line 4: "using the extended frequency-dependent reverberation" should read -- - using the extended frequency-dependent reverberation --.

Claim 11: Column 15, Line 7: "using the mixing time to adjust the start time of the late" should read -- - using the mixing time to adjust the start time of the late --.

Signed and Sealed this  
Seventeenth Day of October, 2023

Katherine Kelly Vidal  
*Director of the United States Patent and Trademark Office*